United States Patent
Ohneda et al.

(10) Patent No.: US 7,386,741 B2
(45) Date of Patent: Jun. 10, 2008

(54) METHOD AND APPARATUS FOR SELECTIVELY ASSIGNING CIRCUIT DATA TO A PLURALITY OF PROGRAMMABLE LOGIC CIRCUITS FOR MAINTAINING EACH PROGRAMMABLE LOGIC CIRCUIT WITHIN AN OPERATION RANGE AT A MINIMUM VOLTAGE

(75) Inventors: Taku Ohneda, Kanagawa-ken (JP); Shinichi Kanno, Kanagawa-ken (JP); Masaya Tarui, Kanagawa-ken (JP); Yukimasa Miyamoto, Kanagawa-ken (JP); Riku Ogawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 378 days.

(21) Appl. No.: 11/128,187

(22) Filed: May 13, 2005

(65) Prior Publication Data
US 2005/0268125 A1 Dec. 1, 2005

(30) Foreign Application Priority Data
May 17, 2004 (JP) .............................. 2004-146554

(51) Int. Cl.
*G06F 1/00* (2006.01)
*G06F 1/26* (2006.01)
(52) U.S. Cl. ..................... 713/300; 713/320; 713/322
(58) Field of Classification Search ................ 713/300, 713/320, 322
See application file for complete search history.

(56) References Cited

U.S. PATENT DOCUMENTS 5,751,164 A    5/1998  Sharpe-Geisler et al.
5,958,058 A *  9/1999  Barrus .......................... 713/320
6,240,521 B1 * 5/2001  Barber et al. ................ 713/323
6,304,101 B1  10/2001  Nishihara
6,487,710 B1 * 11/2002 Marquez ....................... 716/16
6,622,253 B2 * 9/2003  Bacon .......................... 713/322
6,718,475 B2 * 4/2004  Cai ............................. 713/323
6,922,735 B2 * 7/2005  Chang ............................ 710/5
6,941,539 B2 * 9/2005  Hammes ...................... 713/100
6,996,709 B2 * 2/2006  Arnold et al. ............... 713/100
7,100,060 B2 * 8/2006  Cai et al. ..................... 713/320
2004/0073822 A1 * 4/2004 Greco et al. ................. 713/320
2005/0268125 A1 * 12/2005 Ohneda et al. ............. 713/300

FOREIGN PATENT DOCUMENTS

JP        8-44581     2/1996

OTHER PUBLICATIONS

U.S. Appl. No. 11/387,872, filed Mar. 24, 2006, Kanno et al.

* cited by examiner

*Primary Examiner*—Mark Connolly
(74) *Attorney, Agent, or Firm*—Oblon, Spivak, McClelland, Maier & Neustadt, P.C.

(57) ABSTRACT

Programmable logic circuits are changeable circuit components based on circuit data. A circuit data memory stores a plurality of circuit data and performance requirements. A feature data memory stores feature data of each programmable logic circuit. A control unit calculates a minimum voltage of the plurality of programmable logic circuits to execute the plurality of circuit data based on the performance requirements, and selectively assigns the plurality of circuit data to the plurality of programmable logic circuits so that the performance requirement of circuit data assigned to each programmable logic circuit is within the operation range of the programmable logic circuit at the minimum voltage. A supply unit supplies the minimum voltage to the plurality of programmable logic circuits.

19 Claims, 21 Drawing Sheets

METHOD AND APPARATUS FOR SELECTIVELY ASSIGNING CIRCUIT DATA TO A PLURALITY OF PROGRAMMABLE LOGIC CIRCUITS FOR MAINTAINING EACH PROGRAMMABLE LOGIC CIRCUIT WITHIN AN OPERATION RANGE AT A MINIMUM VOLTAGE

CROSS-REFERENCE TO RELATED APPLICATIONS

This application is based upon and claims the benefit of priority from prior Japanese Patent Application P2004-146554, filed on May 17, 2004; the entire contents of which are incorporated herein by reference.

FIELD OF THE INVENTION

The present invention relates to a logic circuit apparatus for simultaneously using a plurality of programmable logic circuits.

BACKGROUND OF THE INVENTION

A circuit configured in one integrated circuit may execute processing of a plurality of steps. Sometimes, a step is required for a quick speed processing performance and a step is required for a low speed processing performance. In such a case, the operation speed of the integrated circuit follows the step of quick speed processing performance. Accordingly, in the integrated circuit, processing performance is left over while power consumption becomes large.

In order to reduce power consumption of the integrated circuit, a method for lowering a frequency of clock signal (clock frequency) is known as an effective method. Normally, an operable voltage is approximated as a primary function of operation frequency, and power consumption is proportion to a product of a square of a voltage and a frequency. Accordingly, by controlling the frequency and the voltage, the power consumption can be lowered. On the other hand, lowering the clock signal frequency means lowering the processing performance of the integrated circuit.

Recently, a programmable logic function changeable during operation of a function to be realized is proposed. The programmable logic function can change all or a part of logic configuration of a circuit during operation of the circuit. For example, a field programmable gate array (FPGA) has a logic configuration that is quickly changeable. Hereinafter, such circuits are called "a programmable logic circuit".

In a method for operating the programmable logic circuit in time sharing, a unit circuit as a step required for a quick processing performance is operated for a long time while a unit circuit as a step sufficient for a slow processing performance is operated for a short time. In this case, a surplus of processing performance can be reduced.

In case of a logic circuit apparatus including a plurality of programmable logic circuits, a unit circuit (a processing) is assigned to each programmable logic circuit so that a total processing time of each programmable logic circuit is averaged. In addition to this, by changing a clock frequency and a supply voltage, the power consumption can be reduced. However, if each programmable logic circuit has a different operation feature (voltage and frequency), the operation feature of the circuit having the poorest feature controls. Accordingly, a programmable logic circuit of better power efficiency can not be effectively utilized.

On the other hand, a programmable information system having a self-repairing function is proposed in Japanese Patent Disclosure (Kokai) PH08-44581. In this system, components are automatically reconstituted against a fault so that normal functions can be reproduced. However, if a fault occurs in an arbitrary programmable logic circuit of the system, the system cannot cope with the fault.

SUMMARY OF THE INVENTION

The present invention is directed to a logic circuit apparatus for lowering a total power consumption by suitably supplying a voltage to each programmable logic circuit even if each programmable logic circuit has a different operation feature.

According to an aspect of the present invention, there is provided a logic circuit apparatus, comprising: a plurality of programmable logic circuits, each configured to have a changeable circuit component based on circuit data; a circuit data memory to store a plurality of circuit data and performance requirements, the circuit data representing a unit circuit of processing, a performance requirement representing processing performance for the unit circuit; a supply unit configured to supply a voltage to the plurality of programmable logic circuits; a feature data memory to store feature data of each programmable logic circuit, the feature data representing an operation range of a voltage; and a control unit configured to calculate a minimum voltage of the plurality of programmable logic circuits to execute the plurality of circuit data based on the performance requirements, to selectively assign the plurality of circuit data to the plurality of programmable logic circuits so that the performance requirement of circuit data assigned to each programmable logic circuit is within the operation range of the programmable logic circuit at the minimum voltage, and to control said supply unit to supply the minimum voltage to the plurality of programmable logic circuits.

According to another aspect of the present invention, there is also provided a logic circuit apparatus, comprising: a plurality of programmable logic circuits each configured to have a changeable circuit component based on circuit data, each programmable logic circuit differently having a processing performance; a circuit data memory to store a plurality of circuit data and performance requirements each for the circuit data; and a control unit configured to selectively assign the plurality of circuit data to the plurality of programmable logic circuits based on the processing performance and the performance requirements.

According to still another aspect of the present invention, there is also provided a computer program product, comprising: a computer readable program code embodied in said product for causing a computer to use a plurality of programmable logic circuits each having a changeable circuit component based on circuit data, said computer readable program code comprising: a first program code to store a plurality of circuit data and performance requirements, the circuit data representing a unit circuit of processing, a performance requirement representing processing performance for the unit circuit; a second program code to store feature data of each programmable logic circuit, the feature data representing an operation range of a voltage; a third program code to calculate a minimum voltage of the plurality of programmable logic circuits to execute the plurality of circuit data based on the performance requirements; a fourth program code to selectively assign the plurality of circuit data to the plurality of programmable logic circuits so that the performance requirement of circuit data assigned to each programmable logic circuit is within the operation range of the programmable logic circuit at the minimum voltage; and a fifth program code to supply the minimum voltage to the plurality of programmable logic circuits.

DETAILED DESCRIPTION OF THE EMBODIMENTS

Figure 1:
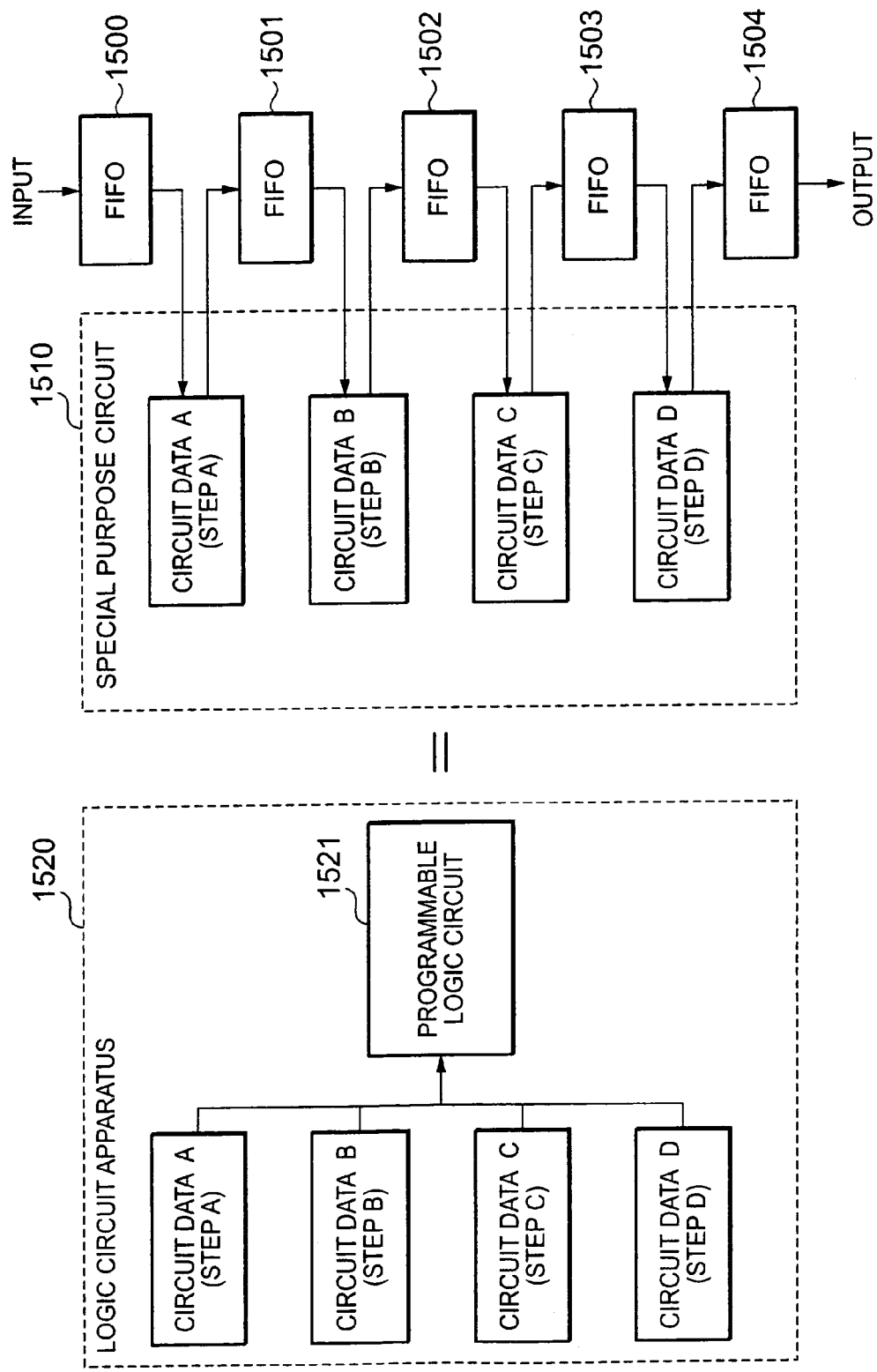
FIG. 1 is a block diagram of a logical circuit apparatus as one application example.

Hereinafter, various embodiments of the present invention will be explained by referring to the drawings. In advance of explanation of embodiments, a summary of a logic circuit apparatus including a plurality of programmable logic circuits is explained. FIG. 1 is a block diagram of the logic circuit apparatus as one application example. In this application example, processing comprised of four steps (step A~step D) is executed by one programmable logic circuit 1521. In order to simplify the explanation, a case of one programmable logic circuit is explained.

In general, this processing can be realized by a special purpose circuits A, B, C, and D (corresponding to each step) and FIFO type memories 1500, 1501, 1502, 1503, and 1504 to temporarily store input/output of each special purpose circuit. However, in FIG. 1, instead of using four special purpose circuits, a logic circuit apparatus 1520 including a programmable logic circuit 1521 and circuit data A, B, C and D are used.

Figure 2:
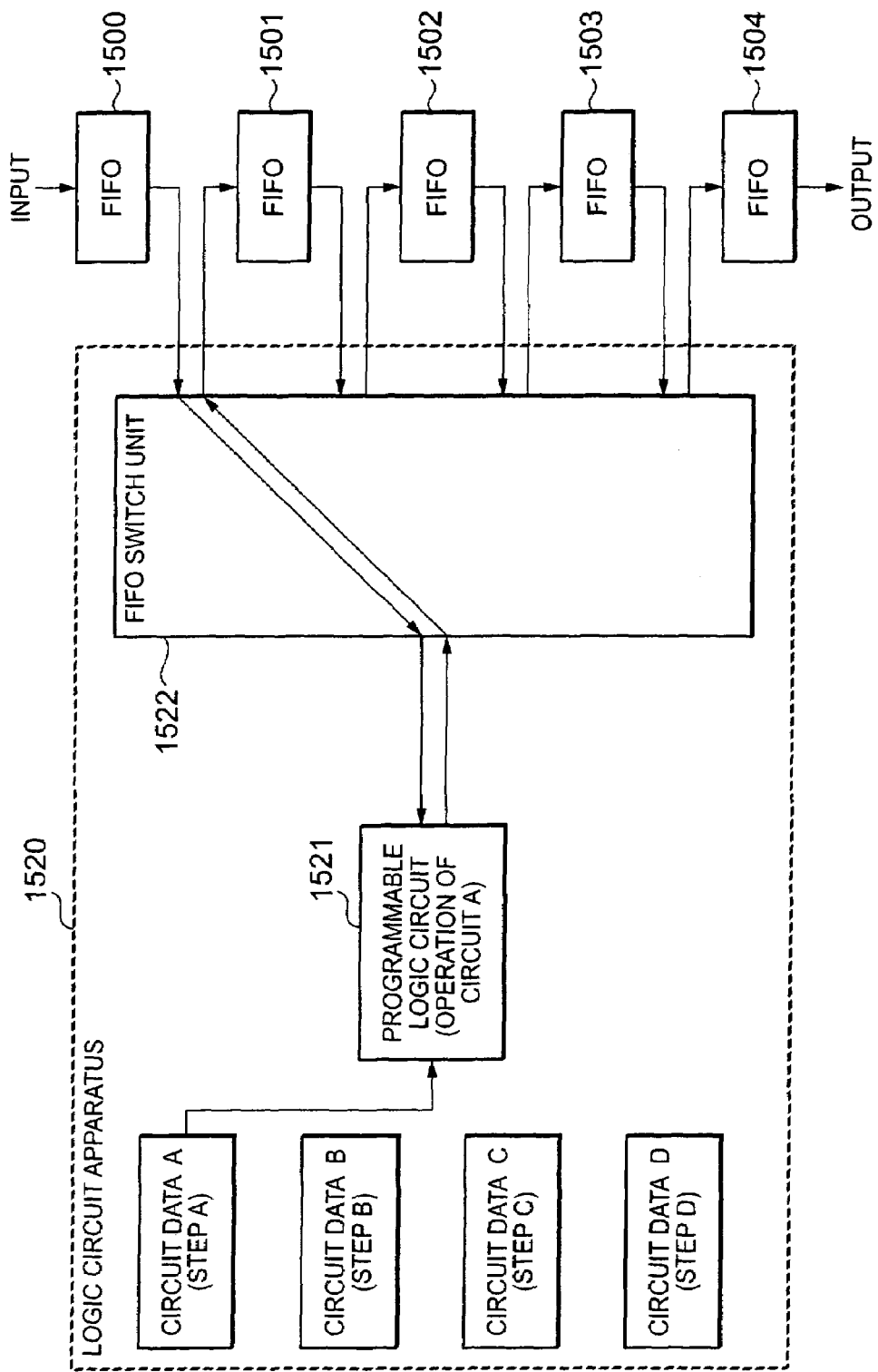
FIG. 2 is a block diagram of a first operation status of a programmable logic circuit.
Figure 3:
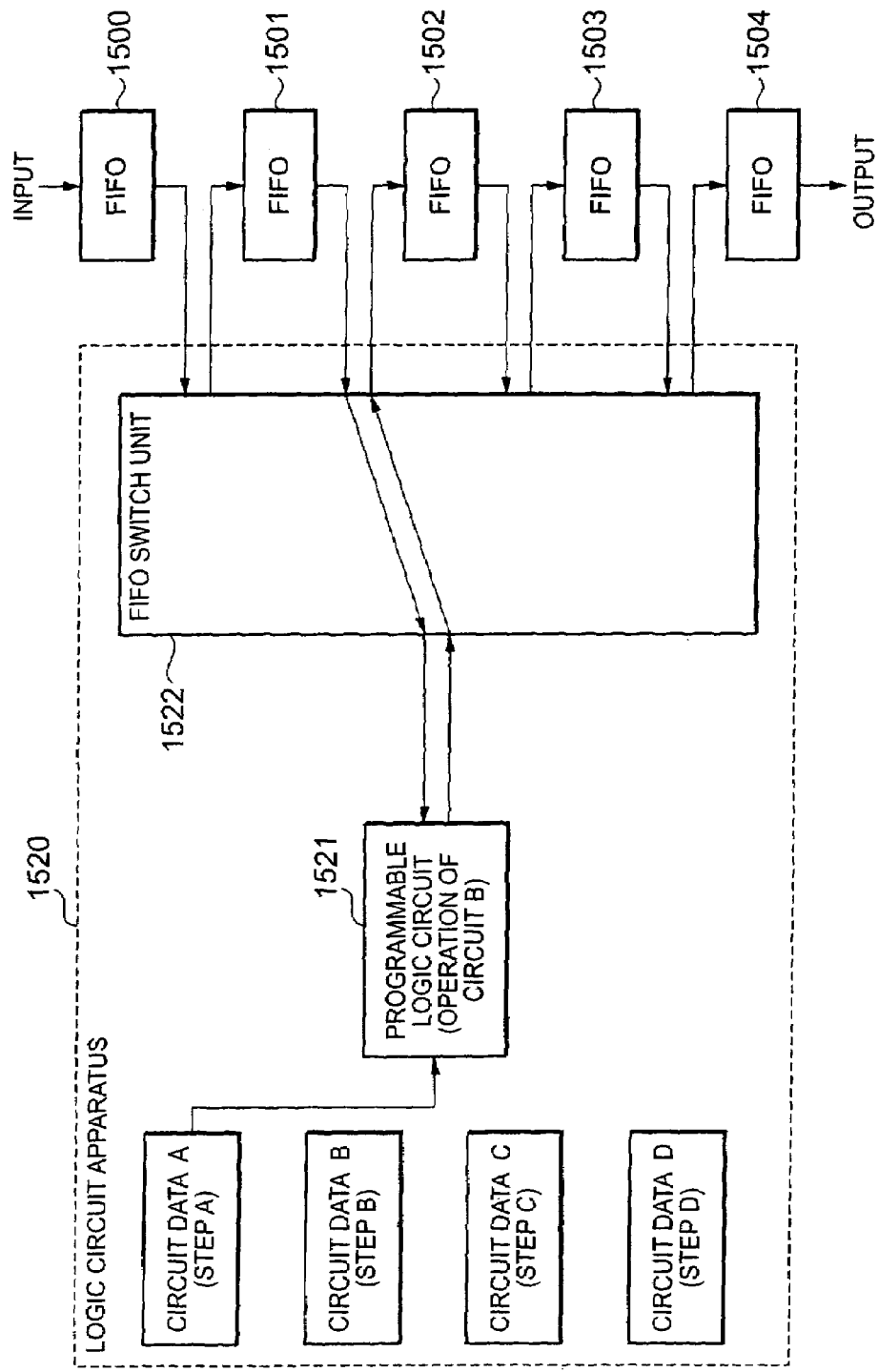
FIG. 3 is a block diagram of a second operation status of the programmable logic circuit.
Figure 4:
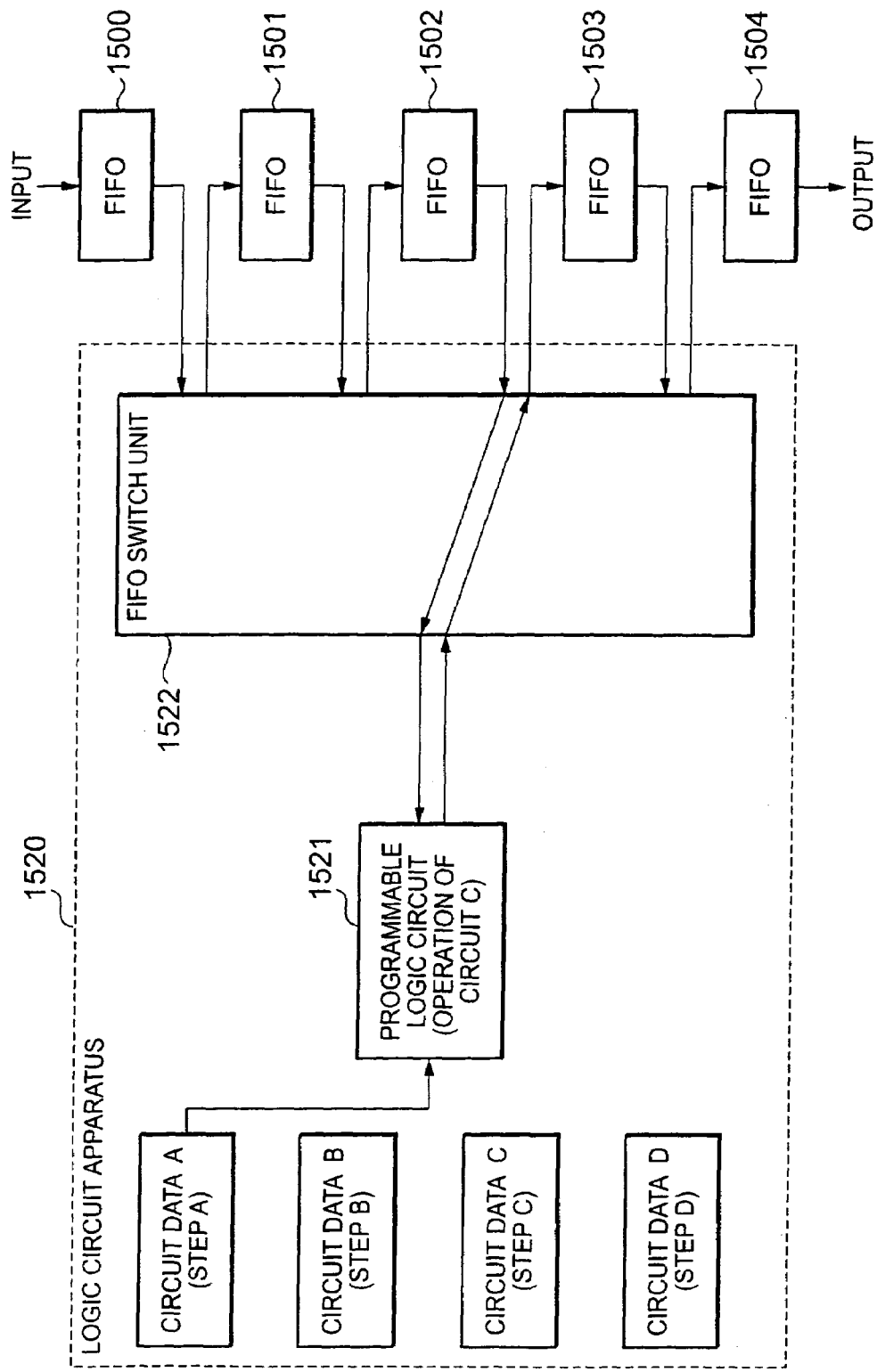
FIG. 4 is a block diagram of a third operation status of the programmable logic circuit.
Figure 5:
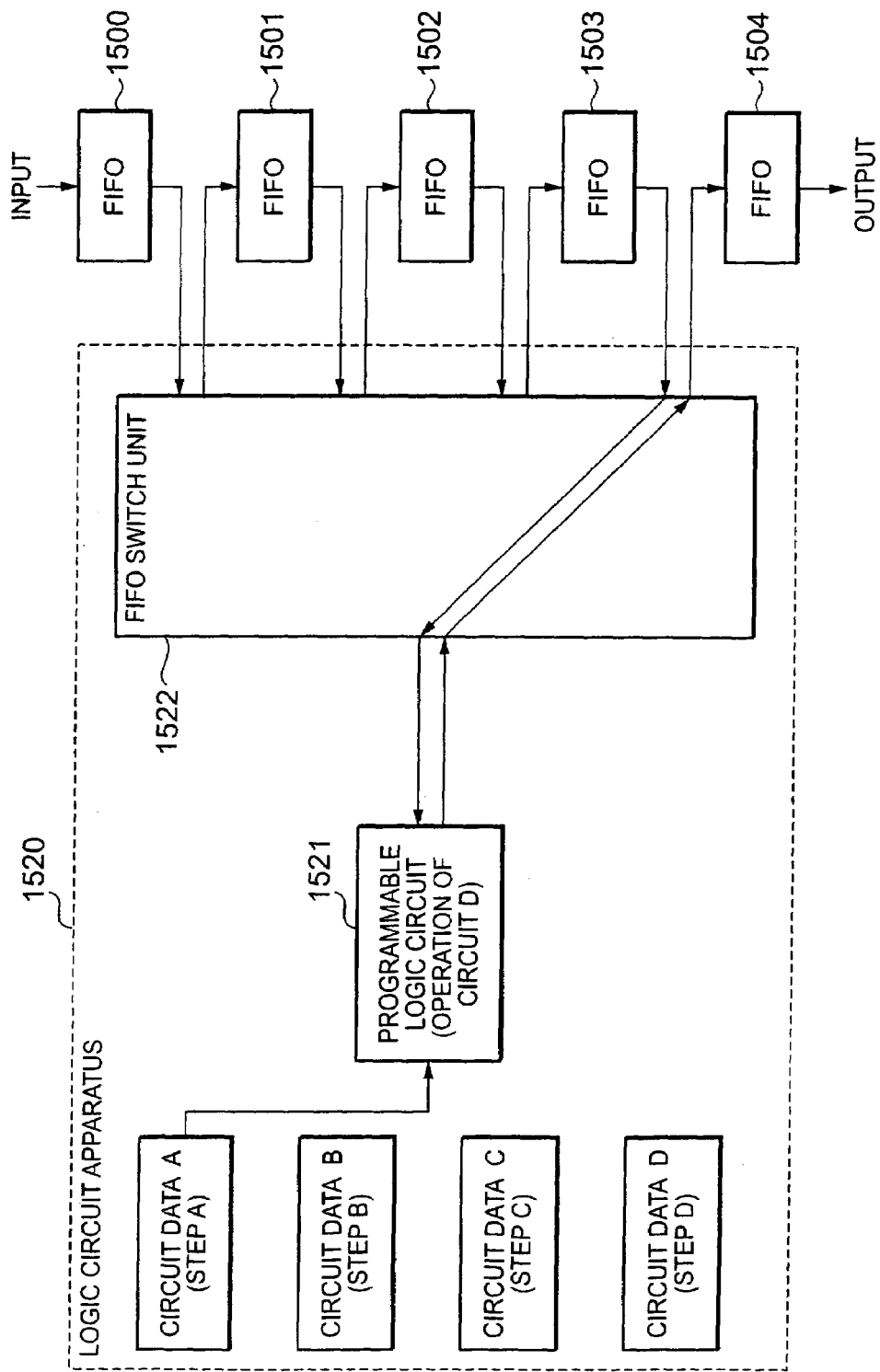
FIG. 5 is a block diagram of a fourth operation status of the programmable logic circuit.

Furthermore, the programmable logic circuit 1521 has a property of reconfiguration of the circuit. Briefly, by changing circuit data from outside, the programmable logic circuit can change its circuit configuration. For example, as shown in FIG. 2, the programmable logic circuit 1521 operates as a circuit A based on circuit data A. In this case, as shown in FIG. 3, by supplying circuit data B, the programmable logic circuit 1521 operates as a circuit B.

The logic circuit 1520 of the present embodiment utilizes the property of reconfiguration of the programmable logic circuit. As shown in FIGS. 2~5, the programmable logic circuit 1521 is operated as a circuit A at first timing, is operated as a circuit B at second timing, is operated as a circuit C as third timing, and is operated as a circuit D at fourth timing. Accordingly, at the first timing, processing of the circuit A is only executed while processing of other circuits B~D is stopped. In this way, by changing a kind of circuit realized by the programmable logic circuit 1521, processing of steps A, B, C, and D is selectively executed.

In case of changing a circuit to be operated, a FIFO switch unit 1522 changes a FIFO type memory connected to the programmable logic circuit 1521. For example, in case of operating the programmable logic circuit 1521 as the circuit C, FIFO 1502 is connected to an input side of the programmable logic circuit 1521, and FIFO 1503 is connected to an output side of the programmable logic circuit 1521. In case of operating the programmable logic circuit 1521 as the circuit D, FIFO 1503 is connected to an input side of the programmable logic circuit 1521, and FIFO 1504 is connected to an output side of the programmable logic circuit 1521.

Operation order of each circuit by the programmable logic circuit 1521 may be previously determined or dynamically determined.

Figure 6:
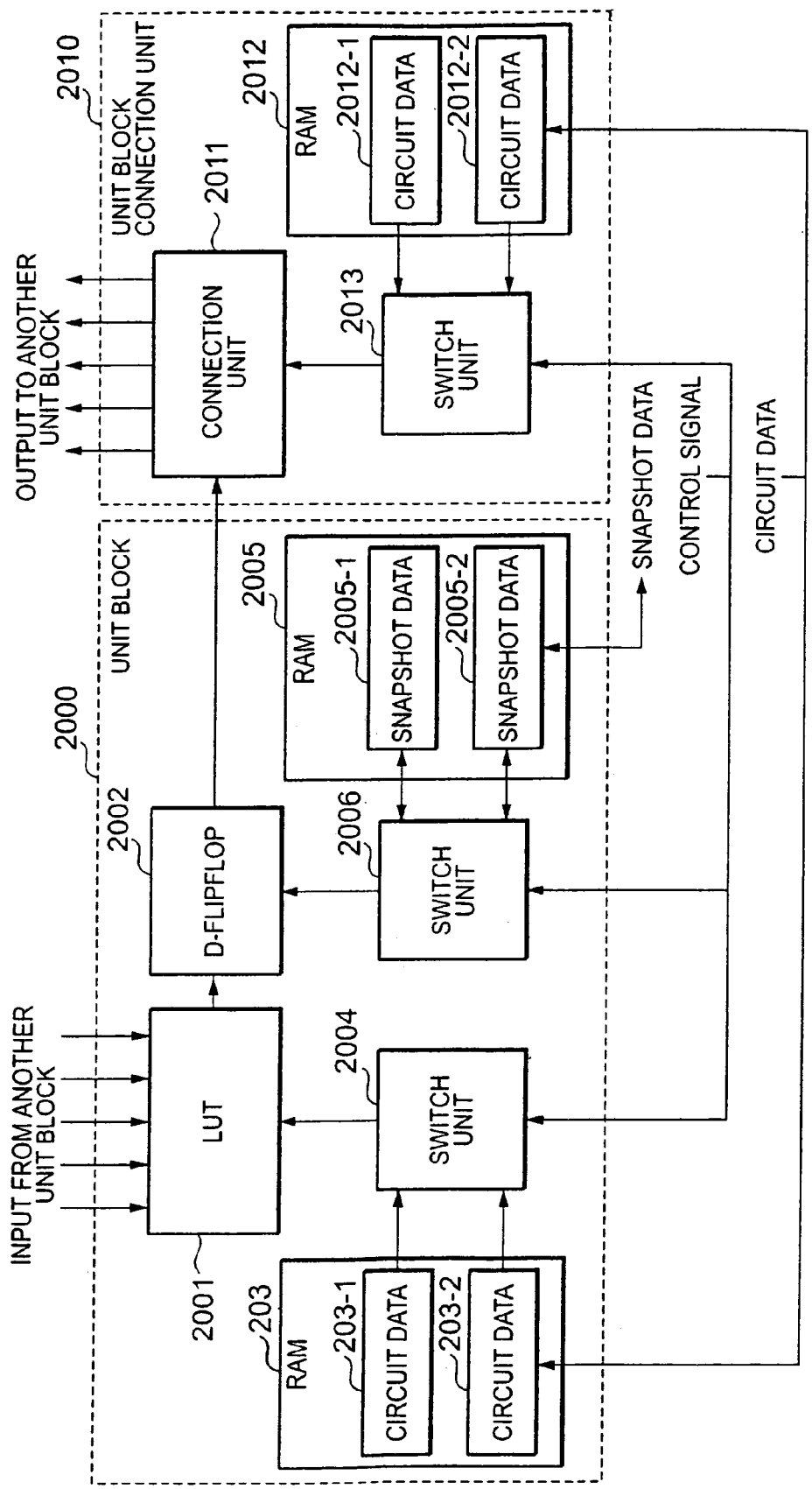
FIG. 6 is a block diagram of inner component of the programmable logic circuit.

FIG. 6 is a block diagram of inner components of the programmable logic circuit 1521. The programmable logic circuit 1521 includes a plurality of unit blocks 2000, and a plurality of unit block connection units 2010 to connect each unit block. The unit block 2000 includes a LUT 2001 to execute logic operation of input data, and a D-FlipFlop 2002 to synchronize output in case of outputting an operation result of LUT 2001 to another unit block. The unit block 2000 includes a RAM 2003 to store a plurality of circuit data, and a switch unit 2004 to switch circuit data to be supplied to the LUT 2001. Furthermore, the unit block 2000 includes a RAM 2005 to save and restore snapshot (state) data of the D-FlipFlop 2002 in case of switching circuit data for the LUT 2001, and a switch unit 2006 to switch the snapshot data to be saved and restored.

The unit block connection unit 2010 includes a connection unit 2011 to output an operation result from the unit block 2000 to another unit block based on circuit data of connection relation between unit blocks, a RAM 2012 to store a plurality of circuit data prescribing connection relationship among unit blocks, and a switch unit 2013 to switch circuit data to be supplied to the connection unit 2011.

The RAM 2003 receives circuit data related to logic operation from outside and stores the circuit data. The RAM 2012 receives circuit data related to connection relationship between unit blocks from outside and stores the circuit data. The RAM 2005 sends and receives the snapshot data with outside. The switch units 2004, 2006, and 2013 execute switch operation in response to a control signal from the outside.

Figure 7:
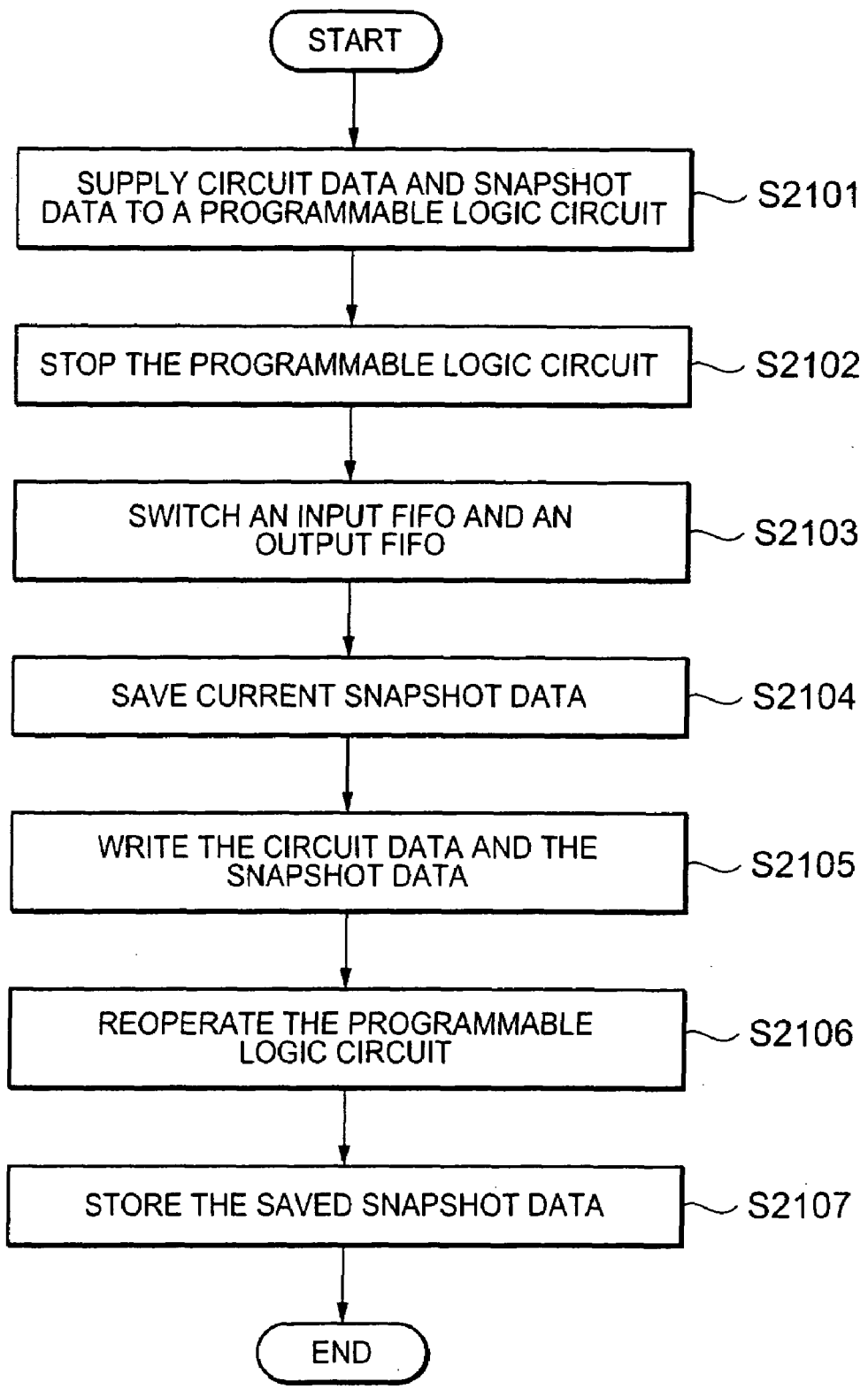
FIG. 7 is a flow chart of processing of reconfiguration of the programmable logic circuit.

FIG. 7 is a flow chart of processing of reconfiguration during operation of the programmable logic circuit 1521. In this case, control of reconfiguration is executed by a control unit (not shown in FIG. 6) outside of the programmable logic circuit 1521.

At process S2101, the control unit respectively supplies circuit data 2003-2 and circuit data 2012-2 (corresponding to a circuit to be operated) from outside to the RAM 2003 and the RAM 2012. Furthermore, the control unit supplies snapshot data 2005-2 (corresponding to the circuit) from outside to the RAM 2005.

At S2102, the control unit stops the supply of clock signal to the programmable logic circuit 1521 and stops the processing of the programmable logic circuit 1521.

At S2103, the control unit connects FIFO (not shown in FIG. 6) to the programmable logic circuit 1521.

At S2104, the control unit sends a control signal to the switch unit 2006 and saves snapshot data of the D-FlipFlop 2002 in the RAM 2005. The saved snapshot data is stored as snapshot data 2005-1 in the RAM 2005.

At S2105, the control unit sends a control signal to the switch unit 2004. The switch unit 2004 copies circuit data 2003-2 (related to the circuit to be operated) from the RAM 2003 to the LUT 2001. The control unit sends a control signal to the switch unit 2013. The switch unit 2013 copies circuit data 2012-2 (related to connection relationship of the circuit to be operated) from the RAM 2012 to the connection unit 2011. Furthermore, the control unit sends a control signal to the switch unit 2006. The switch unit 2006 restores snapshot data 2005-2 (corresponding to the circuit to be operated) on the D-FlipFlop 202.

At S2107, the control unit starts supply of clock signal again. Furthermore, if necessary, the snapshot data 2005-1 saved in the RAM 2005 (at S2104) may be preserved in an outside memory (not shown in FIG. 6).

In this way, reconfiguration of logic circuit is executed. If the necessary data is already stored in the RAM 2003, 2005, and 2012, step. S2101 can be omitted.

Hereinafter, various embodiments of the present invention are explained by referring to the Figures.

Figure 8:
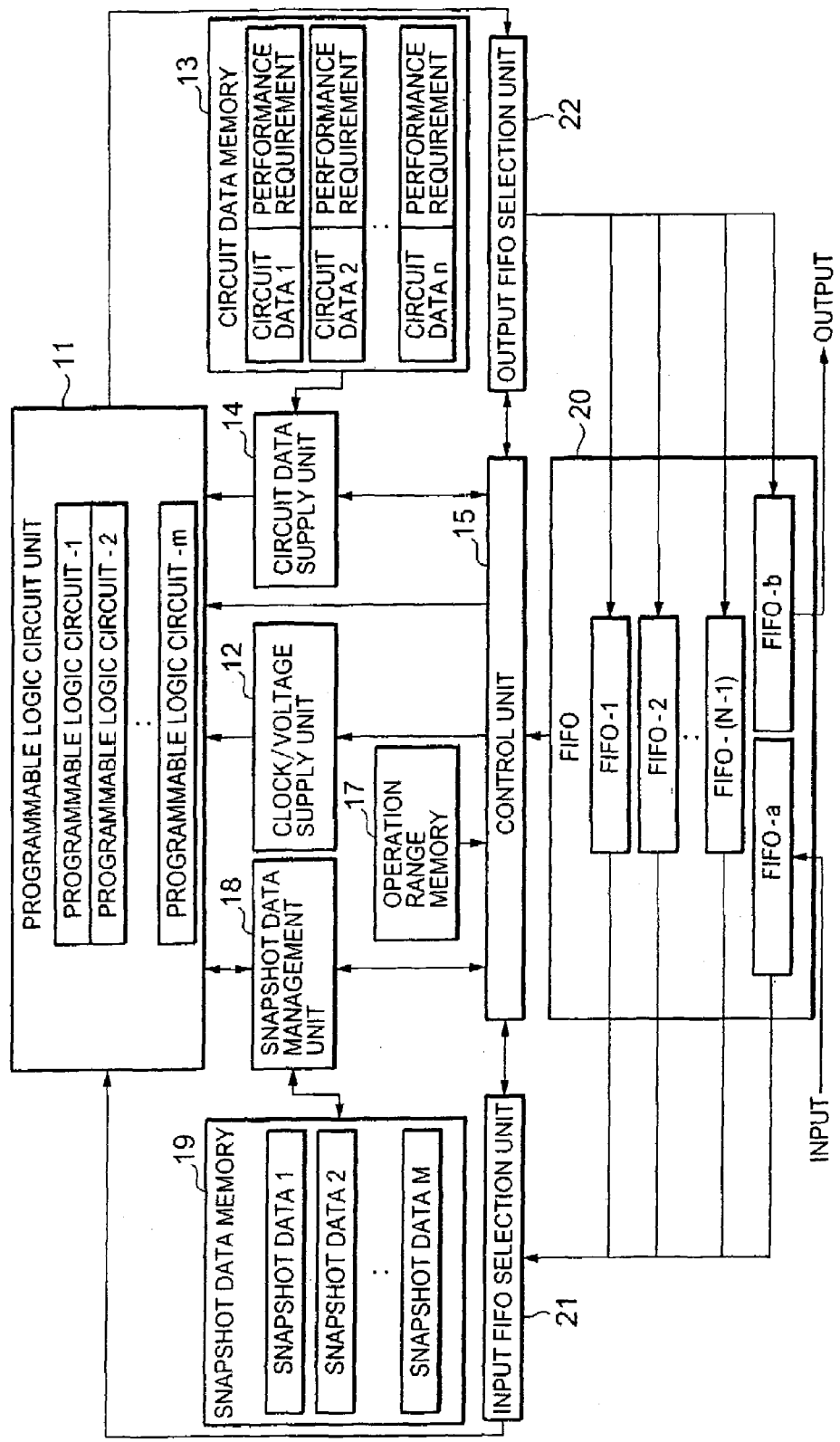
FIG. 8 is a block diagram of a logic circuit apparatus according to a first embodiment.

FIG. 8 is a block diagram of a logic circuit apparatus according to a first embodiment. By referring to FIG. 8, the logic circuit apparatus using a plurality of operation changeable circuits (i.e., a plurality of programmable logic circuits) is explained.

The programmable logic circuit unit 11 includes a plurality of programmable logic circuits 1, 2, . . . m, and is fed by a circuit/voltage supply unit 12. The programmable logic circuits 1, 2, . . . m, have substantially the same configuration, but different processing performance and operation features. In the first embodiment, a difference between upper limits of operable processing speed of the programmable logic circuits is 30% at a maximum. The operation feature is the relationship between a clock frequency and a supply voltage. In the first embodiment, even if the programmable logic circuits 1, 2, . . . m, have the same clock frequency, they are not always operable by the same supply voltage.

Furthermore, the programmable logic circuits 1, 2, . . . m, respectively include a plurality of programmable logic elements and a connection unit to connect these logic elements. By providing logic data, these programmable logic elements function as a logic element such as AND element, OR element, and NOR element. Furthermore, by providing connection data prescribing connection relationship between logic elements, they can execute various operation processing such as the four rules of arithmetic.

A circuit data memory 13 includes a memory area to store a plurality of circuit data 1, 2, . . . m. The circuit data includes information to reconfigure each logic element of the program logic circuit 1, 2, . . . m, i.e., information to program the programmable logic circuit. Concretely, the circuit data includes the above-mentioned logic data and connection data. In the circuit data memory 12, a performance requirement memory area is incidental to each circuit data memory area. The performance requirement memory area stores an index of performance requirements of each unit circuit (circuit data). The unit circuit means a single operation circuit (processing) configured in the programmable logic circuit based on the circuit data. As the index of performance requirement 1, 2, . . . n, for example, in case of constantly operating the unit circuit by a single programmable logic circuit, the minimum clock frequency necessary not to fail processing of the unit circuit is applied.

The circuit data memory 13 is connected to a circuit data supply unit 14. The circuit data supply unit 14 selectively supplies circuit data 1, 2, . . . n of the circuit data memory 13 to the programmable logic circuit 1, 2, . . . m of the programmable logic circuit unit 11 based on a control signal from a control unit 15. Briefly, by the circuit data supply unit 14 and the control unit 15, logic data to selectively program a plurality of programmable logic circuits is input to the plurality of programmable logic circuits, and a predetermined processing is assigned to the plurality of programmable logic circuits based on processing performance of each programmable logic circuit and executed.

An operation range memory 17 and a snapshot data management unit 18 are connected to the control unit 15. The operation range memory 17 stores an upper limit and a lower limit of processing performance (operable index) of each programmable logic circuit. Concretely, the operation range memory 17 stores a power data table representing how many volts (power) and how many MHz (clock frequency) by which each programmable logic circuit is operated.

The snapshot data management unit 18 is connected to a snapshot data memory 19, and manages the operation state of the programmable logic circuit unit 11. For example, the snapshot data memory 19 includes memory areas to store snapshot data 1, 2, . . . M in correspondence with the programmable logic circuit 1, 2, . . . m. When processing of the programmable logic circuit is interrupted, the snapshot data management unit 18 temporarily stores a processing state (snapshot data) in a corresponding memory area of the snapshot data memory 19. The processing state represents an output/input value of each logic element in the programmable logic circuit at interruption timing of processing of the programmable logic circuit.

Furthermore, the control unit 15 is connected to a FIFO apparatus 20, an input FIFO selection unit 21, and an output FIFO selection unit 22. When data input to the FIFO apparatus 20 is stored as a predetermined quantity, the control unit 15 operates the programmable logic circuit unit 11. As shown in FIG. 8, the FIFO apparatus 20 includes FIFO-1~FIFO-(N-1), a FIFO-a for input and a FIFO-b for output.

Hereinafter, a function of the logic circuit apparatus of the first embodiment is explained.

Figure 9:
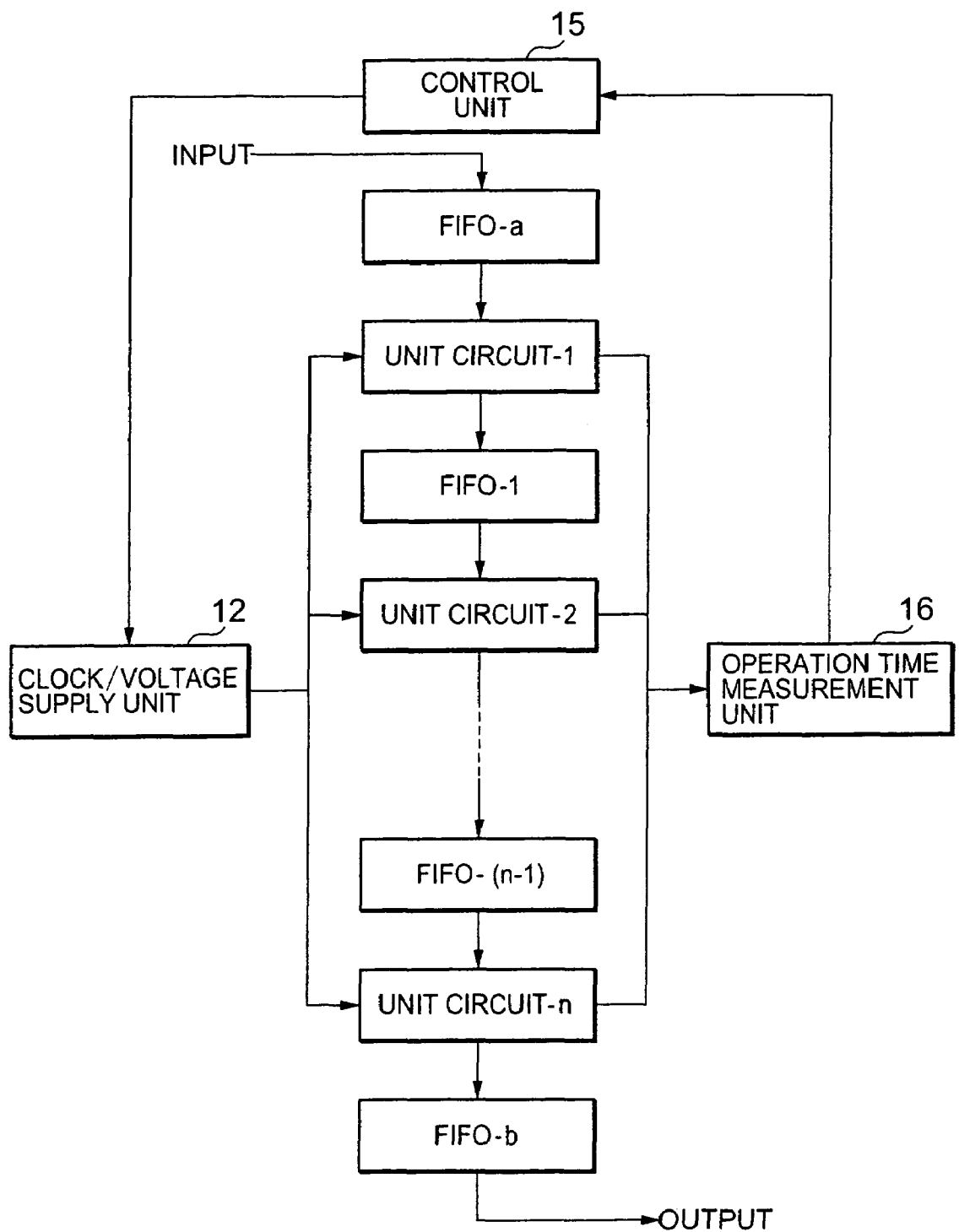
FIG. 9 is a schematic diagram of general processing of the logic circuit apparatus.

FIG. 9 is a schematic diagram of basic processing in components of FIG. 1. As shown in FIG. 9, a plurality of unit circuits 1~n configured by the programmable logic circuits 1~m executes purpose processing. Each unit circuit is connected to a FIFO, and the control unit 15 monitors data quantity stored in each FIFO. In this way, a unit circuit to be executed is determined. The FIFO may be special purpose hardware or utilized as a general purpose memory by First-In First-Out.

For example, the control unit 15 decides whether data quantity in the FIFO as input side of each unit circuit is above a predetermined threshold and whether data quantity in the FIFO as output side of each unit circuit is below a predetermined threshold. Based on the decision result, the control unit 15 determines a unit circuit to be operated by each programmable logic circuit and reconfigures each programmable logic circuit.

In case of executing processing, suitable circuit data is extracted from a plurality of circuit data 1~n stored in the circuit data memory 13 and loaded onto a suitable programmable logic circuit by the circuit data supply unit 14. The unit circuit is configured in the programmable logic circuit. The input FIFO selection unit 21 selects one FIFO storing input data (processing object of the unit circuit) as an input FIFO. The output FIFO selection unit 22 selects one FIFO storing output data (processing result of the unit circuit) as an output FIFO. The input data is supplied from the input FIFO to the programmable logic circuit, and the processing result of the unit circuit is stored in the output FIFO.

Figure 10:
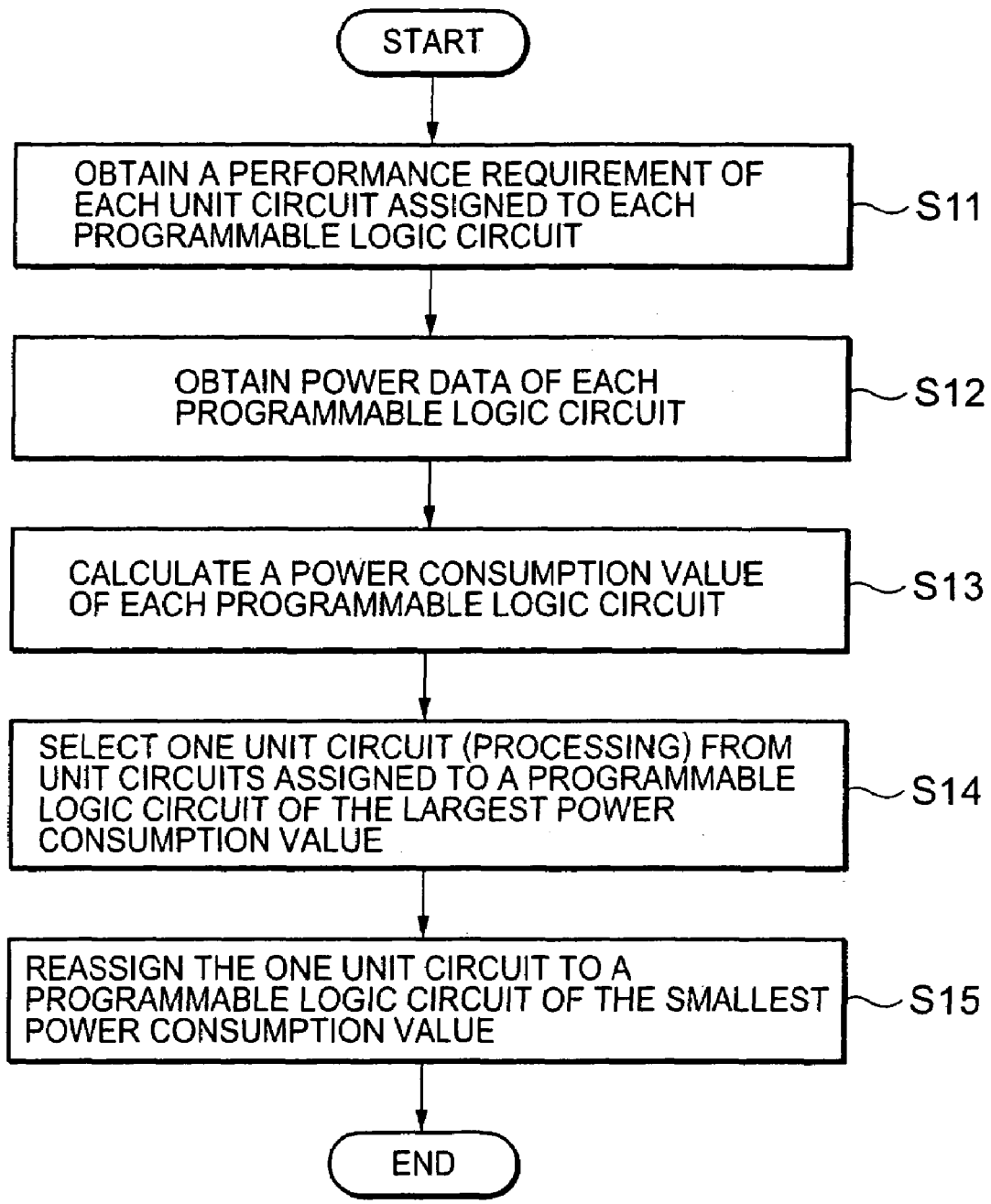
FIG. 10 is a flow chart of assignment processing of a control unit 15 in FIG. 8.

In above-mentioned components, the control unit 15 obtains performance requirement of each unit circuit (circuit data) from a performance requirement memory area of the circuit data memory 13, and assigns a unit circuit to the programmable logic circuit, so that a total power of all programmable logic circuits minimizes on condition that processing performance of each programmable logic circuit is within the upper limit of each programmable logic circuit (stored in the operation range memory 17). FIG. 10 is a flow chart of processing of unit circuit assignment by the control unit 15.

First, by referring to the performance requirement memory area in the circuit data memory 13, the control unit 15 obtains performance requirement (For example, processing speed) of each unit circuit assigned to each programmable logic circuit (S11). The control unit 15 obtains power data (For example, relationship between a clock frequency and a voltage) of each programmable logic circuit (S12). The control unit 15 calculates a total performance requirement of each programmable logic circuit based on the performance requirement of each unit circuit assigned to the programmable logic circuit. Concretely, each programmable logic circuit executes a plurality of processing according to a plurality of circuit data selected from circuit data 1~n, and the total performance requirement to execute processing by each programmable logic circuit is calculated. Next, by referring to the operation range memory 17, the control unit 15 determines processing performance of each programmable logic unit to execute the total performance requirement within a predetermined time, and calculates a power consumption of each programmable logic circuit based on the processing performance (S13).

Furthermore, the control unit 15 compares the power consumption of each programmable logic circuit, selects one of the unit circuits assigned to the programmable logic circuit with the largest power consumption (S14), and reassigns the one unit circuit to another programmable logic circuit of the smallest power consumption (S15).

Assignment of unit circuit may be executed as follows. First, by referring to the performance requirement memory area in the circuit data memory 13, the control unit 15 obtains performance requirement of each unit circuit assigned to each programmable logic circuit, and calculates a total performance requirement of all programmable logic circuits. The control unit 15 obtains power data (representing relationship between a performance requirement and a driving voltage) of each programmable logic circuit stored in the operation range memory 17. By referring to the power data, the control unit 15 calculates a minimum driving voltage of all programmable logic circuits to realize the total performance requirement. On the assumption that each programmable logic circuit is equally operated by the minimum driving voltage, each unit circuit is assigned to a programmable logic circuit. If each unit circuit is assigned so that all programmable logic circuits are normally operated by the minimum driving voltage, this assignment is used. If a clock frequency of any programmable logic circuit at operation time of the minimum driving voltage is above the upper limit of this programmable logic circuit, any unit circuit assigned to this programmable logic circuit is reassigned to another programmable logic circuit. Nevertheless, if a clock frequency of the programmable logic circuit at operation time of the minimum driving voltage is still above the upper limit of this programmable logic circuit, the control unit 15 selectively assigns each unit circuit to a programmable logic circuit again on the assumption that all programmable logic circuits are operated at a higher driving voltage as one phase (minimum unit changeable by the clock/voltage supply unit 12, for example, 0.1V). The control unit 15 repeats the above processing until an assignment succeeds.

Figure 11:
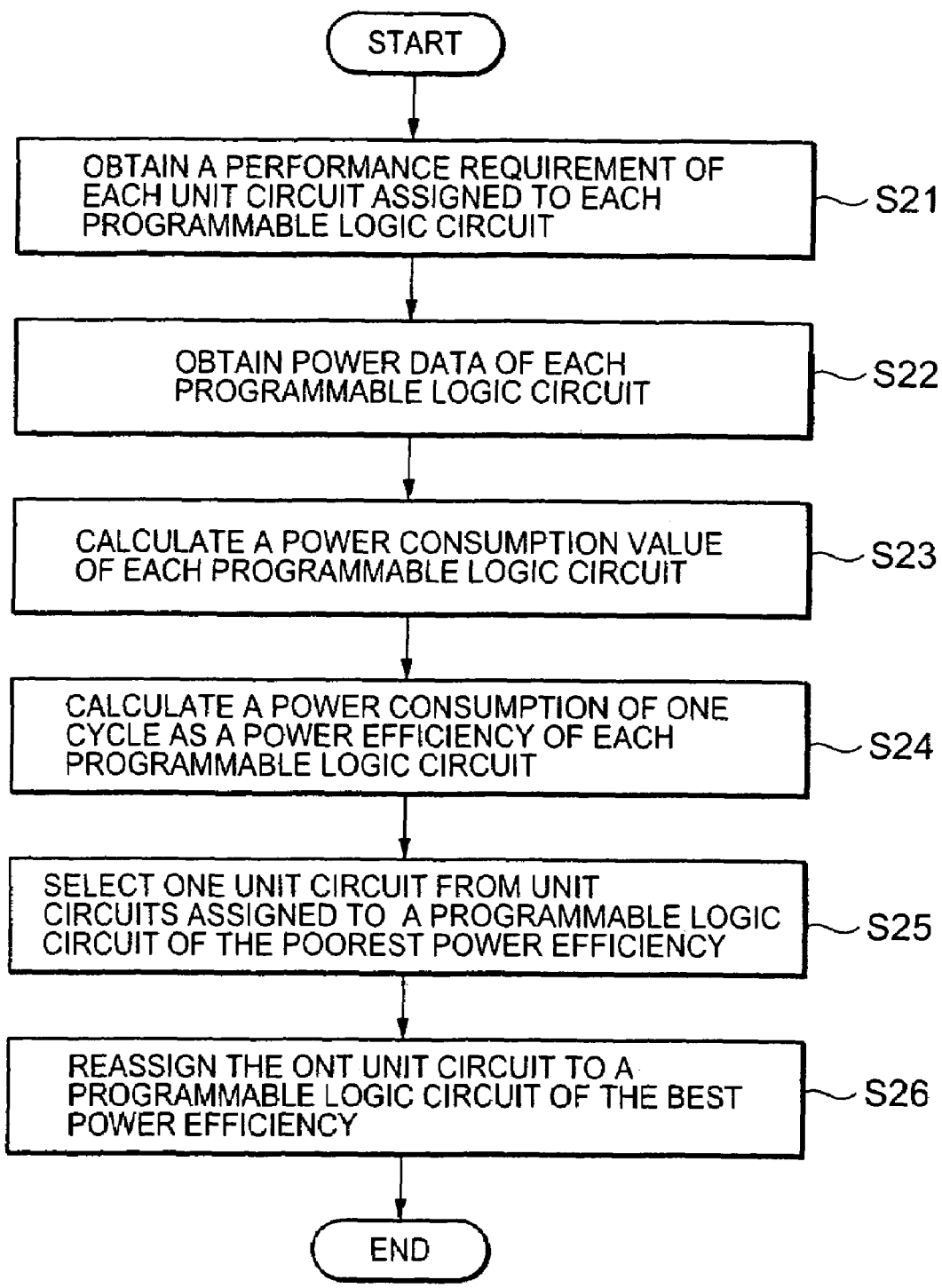
FIG. 11 is a flow chart of processing of the logic circuit apparatus of FIG. 8.

FIG. 11 is a flow chart of another processing of the logic circuit apparatus according to the first embodiment. As shown in FIG. 11, power consumption per one clock is defined as power efficiency, and power efficiency and power consumption of each programmable logic circuit are calculated. By comparing the power efficiency of each programmable logic circuit, one of the unit circuits assigned to the programmable logic circuit of the poorest power efficiency is selected and assigned to another programmable logic circuit of the best power efficiency.

For example, first, performance requirements of unit circuits assigned to each programmable logic circuit are obtained (S21). Power data of each programmable logic circuit is obtained (S22). Power consumption value of each programmable logic circuit is calculated based on the performance requirement and the power data of each programmable logic circuit (S23). Furthermore, power consumption of one clock is calculated as power efficiency of each programmable logic circuit (S24). Based on this calculation result, one of the unit circuits assigned to the programmable logic circuit having the poorest power efficiency is selected (S25). The one unit circuit is reassigned to another programmable logic circuit of the best power efficiency (S26). The power efficiency is not limited to per one clock and may be per a plurality of clocks.

Figure 12:
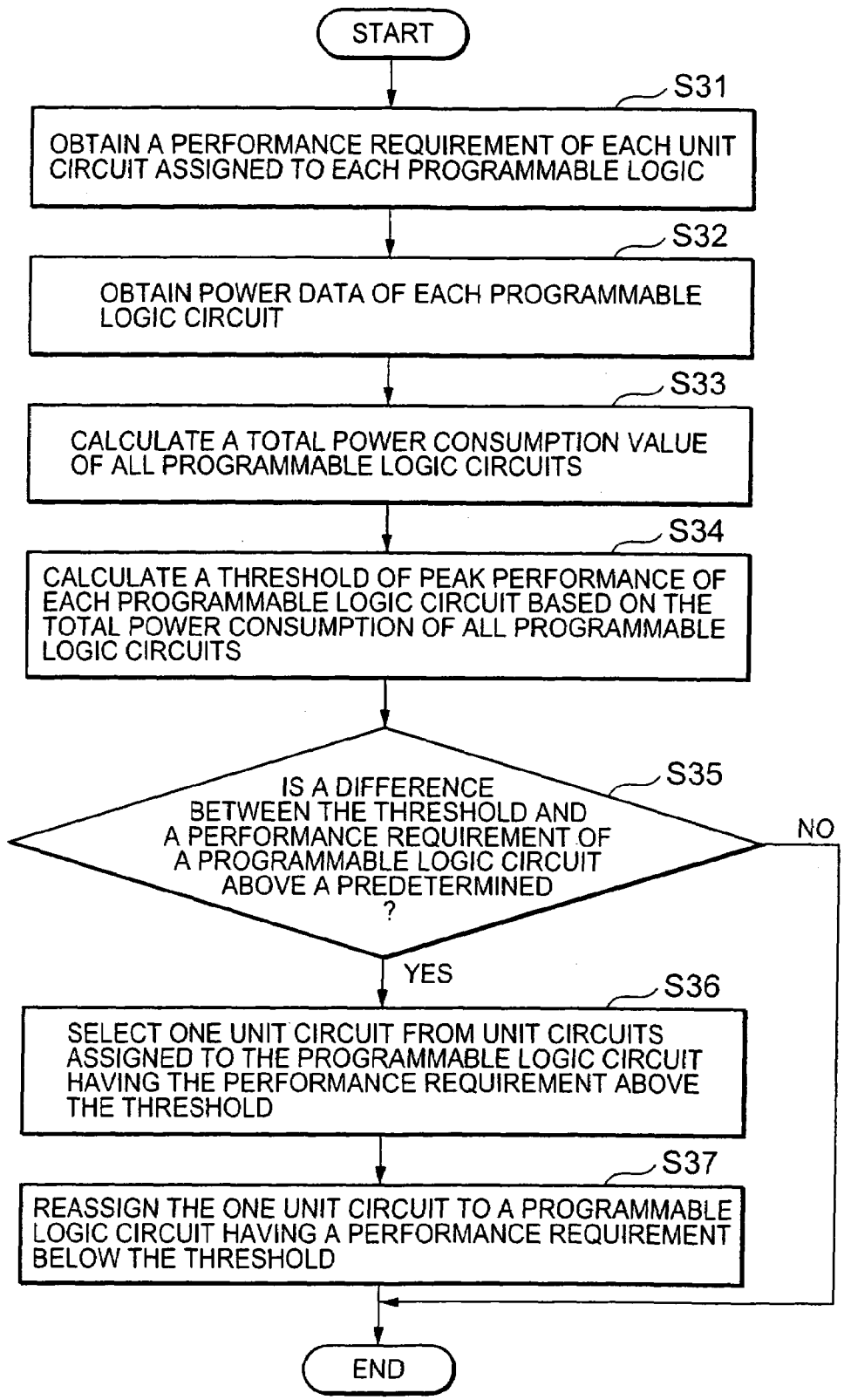
FIG. 12 is a flow chart of another processing of the logic circuit apparatus of FIG. 8.

FIG. 12 is a flow chart of the other processing of the logic circuit apparatus according to the first embodiment. First, performance requirement of each unit circuit assigned to a programmable logic circuit is obtained (S31). Power data of each programmable logic circuit is obtained (S32). Based on the power data, a total power consumption of all programmable logic circuits is calculated (S33). Then, a threshold of peak performance of each programmable logic circuit is calculated based on the total power consumption of all programmable logic circuits (S34). As for each programmable logic circuit, it is decided whether a difference between the threshold and the performance requirement is above a predetermined value (S35). If the difference is above the predetermined value (Yes at S35), one of unit circuits assigned to the programmable logic circuit having a performance requirement above the threshold is selected (S36). The one unit circuit is reassigned to another programmable logic circuit having a performance requirement below the predetermined value (S37). If the difference is not above the predetermined value (No at S35), processing is completed. At S37, the one unit circuit may be assigned to the programmable logic circuit having the best power efficiency.

Furthermore, based on a total performance requirement and power data of all programmable logic circuits, processing performance of each programmable logic circuit in case of ideal assignment for minimum power may be set as a theoretical value. The theoretical value is compared with a total performance requirement of each programmable logic circuit. In this case, one of the unit circuits assigned to the programmable logic circuit having a total performance requirement above the theoretical value is selected and reassigned to another programmable logic circuit having a total performance requirement not above the theoretical value. Assignment change of unit circuits to the programmable logic circuit may be executed at a predetermined interval. Alternatively, by monitoring the total performance requirement of each programmable logic circuit, assignment change of unit circuits may be executed at change time of the total performance requirement.

The operation range memory 17 may store a table correspondingly storing a processing performance and a power consumption value as power data. In this case, in case that the control unit 15 calculates a power consumption value, by referring the table using the processing performance, the power consumption value may be returned. Otherwise, the operation range memory 17 may store a performance/power conversion coefficient as power data. In this case, in case that the control unit 15 calculates power consumption, by calculating the processing performance using the performance/power conversion coefficient, a power consumption value (calculated) may be returned.

In case of selecting one unit circuit at S14, S25, and S36, a unit circuit of the highest performance requirement may be selected from unit circuits assigned to the programmable logic circuit. Otherwise, a unit circuit of the lowest performance requirement may be selected or a predetermined unit circuit may be selected.

By measuring operation time of each unit circuit (For example, the control unit 15 includes a clock as shown in an operation time measurement unit 16 in FIG. 9), even if a processing load of each unit circuit dynamically changes, the processing requirement of each unit circuit can be estimated. For example, a product of operation time and clock frequency can be used as an index representing performance requirement at the timing. By suitably changing assignment based on the estimated performance requirement, even if operation feature of each programmable logic circuit includes individual difference, power consumption of the system can be reduced.

Figure 13:
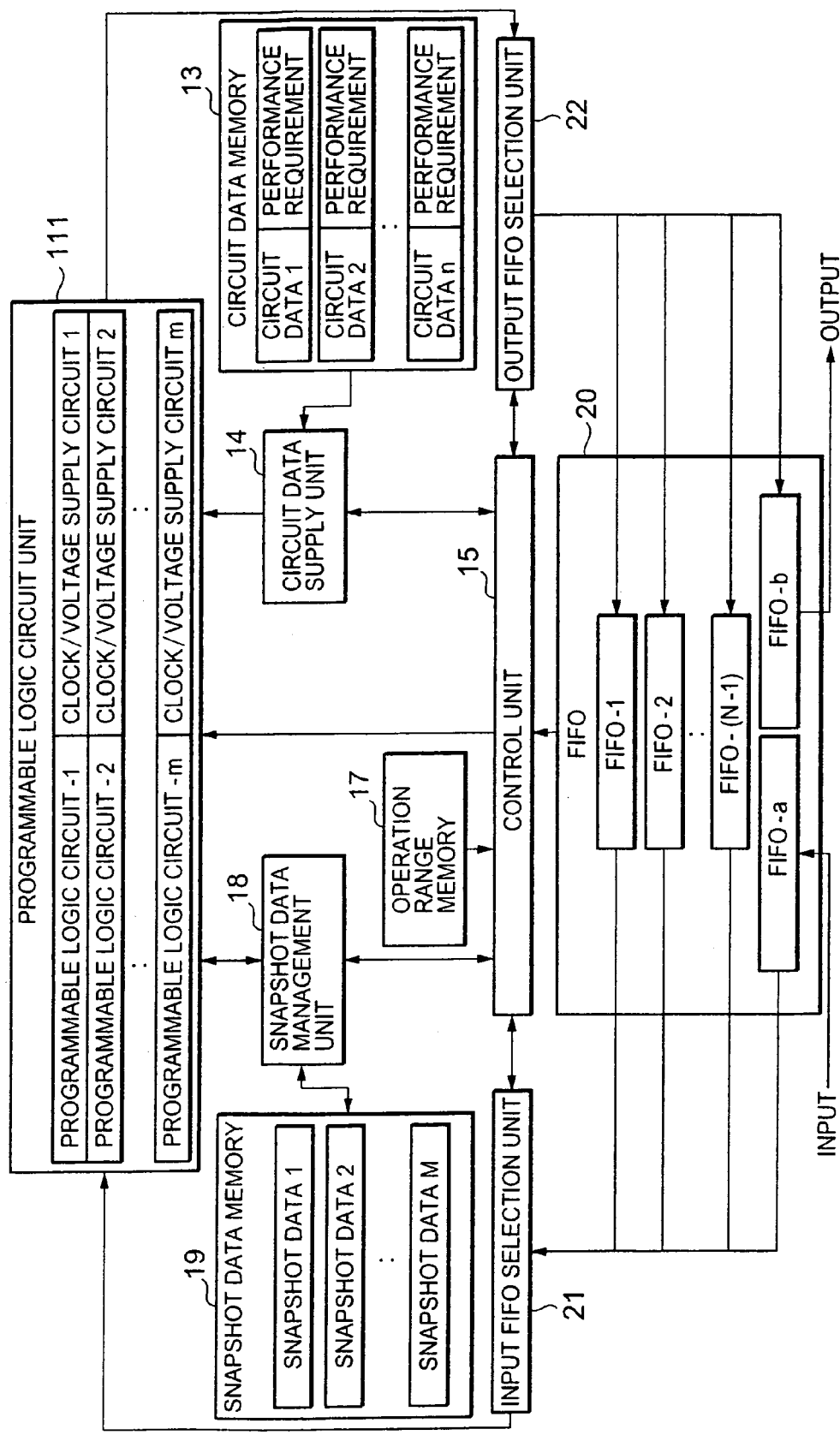
FIG. 13 is a block diagram of the logic circuit apparatus according to a second embodiment.

FIG. 13 is a block diagram of the logic circuit apparatus according to the second embodiment. In the second embodiment, the programmable logic circuit unit 111 includes programmable logic circuits 1~m, and clock/voltage supply units 1~m each connected to and supplying a clock signal/voltage to the programmable logic circuits 1~m. The control unit 15 calculates operation frequency of each programmable logic circuit to execute all processing within a predetermined time based on a total performance requirement of unit circuits assigned to each programmable logic circuit. The operation frequency is sent to clock/voltage supply units. Each clock/voltage supply unit stores a table correspondingly storing a clock frequency and a voltage of a corresponding programmable logic circuit. By referring to the table using the operation frequency, the clock signal and the voltage are supplied to the corresponding programmable logic circuit.

In the second embodiment, unit circuits are assigned to each programmable logic circuit using above-mentioned assignment method based on processing load, and control of frequency/voltage is respectively executed for each programmable logic circuit.

Figure 14:
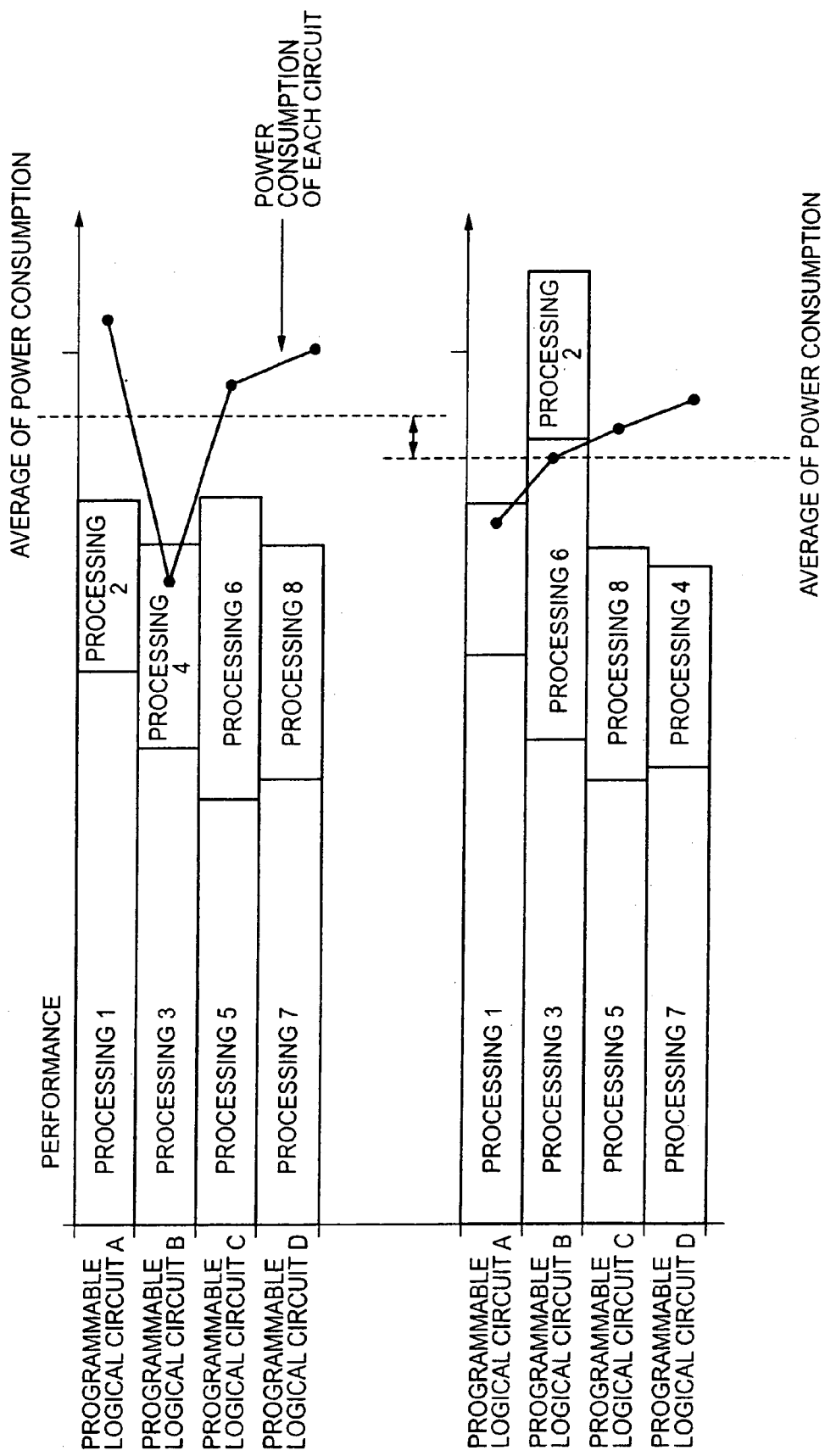
FIG. 14 is a schematic diagram of an assignment method of unit circuits to each programmable logic circuit.

FIG. 14 is a schematic diagram of a power consumption average (upper side graph) in case of assigning unit circuits to equalize the processing load of each programmable logic circuit without considering each operation feature, and a power consumption (lower side graph) in case of assigning unit circuits by considering operation feature of each programmable logic circuit (using the method of the present embodiment).

In FIG. 14, a programmable logic circuit B has better power efficiency in comparison with programmable logic circuits A, C, and D. By using assignment method of unit circuits of the present embodiment, a total performance requirement of the programmable logic circuit B of best power efficiency rises while a total performance requirement of programmable logic circuits A, C, and D of poor power efficiency moves relatively lower. As a result, in comparison with a case of assigning unit circuits to equalize each processing load, the average power consumption of all programmable logic circuits is lower in the assignment method of the present embodiment.

Figure 15:
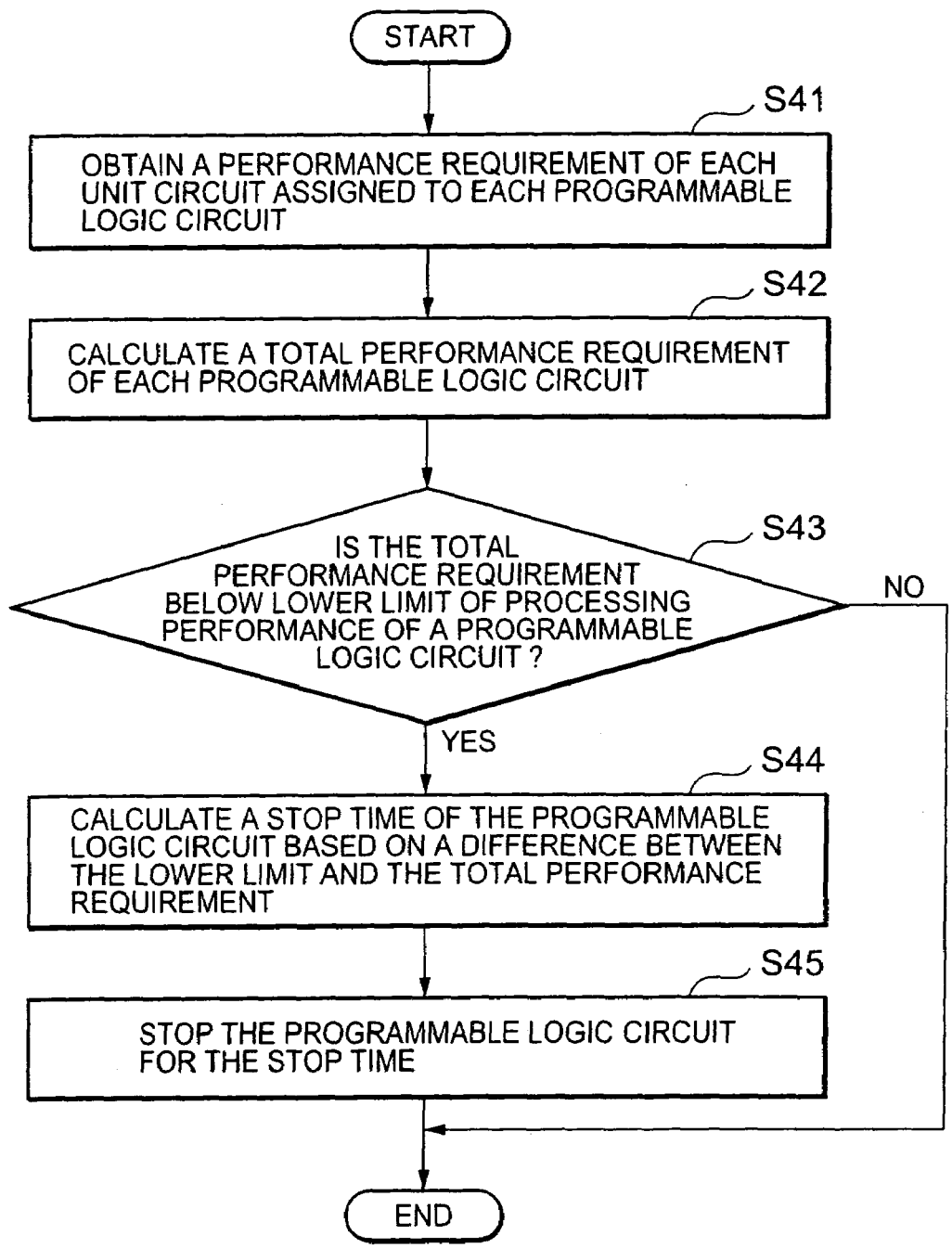
FIG. 15 is a flow chart of processing of the logic circuit apparatus of FIG. 13.

FIG. 15 is a flow chart of processing of the logic circuit apparatus according to a second embodiment. First, performance requirement of unit circuits assigned to each programmable logic circuit is obtained (S41). Next, a total performance requirement of each programmable logic circuit is calculated (S42). In case of assignment change of unit circuits, the control unit 15 compares the total performance requirement of each programmable logic circuit with a lower limit of processing performance of each programmable logic circuit (stored in the operation range memory 17) (S43). If the total performance requirement is below the lower limit, stop time of the programmable logic circuit is calculated based on a difference between the lower limit and the total performance requirement (S44). After this programmable logic circuit executes assigned processing (assigned unit circuits) using processing performance of the lower limit, this programmable logic circuit is stopped for the stop time (S45).

As for the programmable logic circuit being stopped, the control unit 15 may start supply of clock again after a predetermined interval. Furthermore, by controlling operation start of the programmable logic circuit being stopped at a predetermined interval, the control unit 15 may stop the programmable logic circuit at an arbitrary time.

Figure 16:
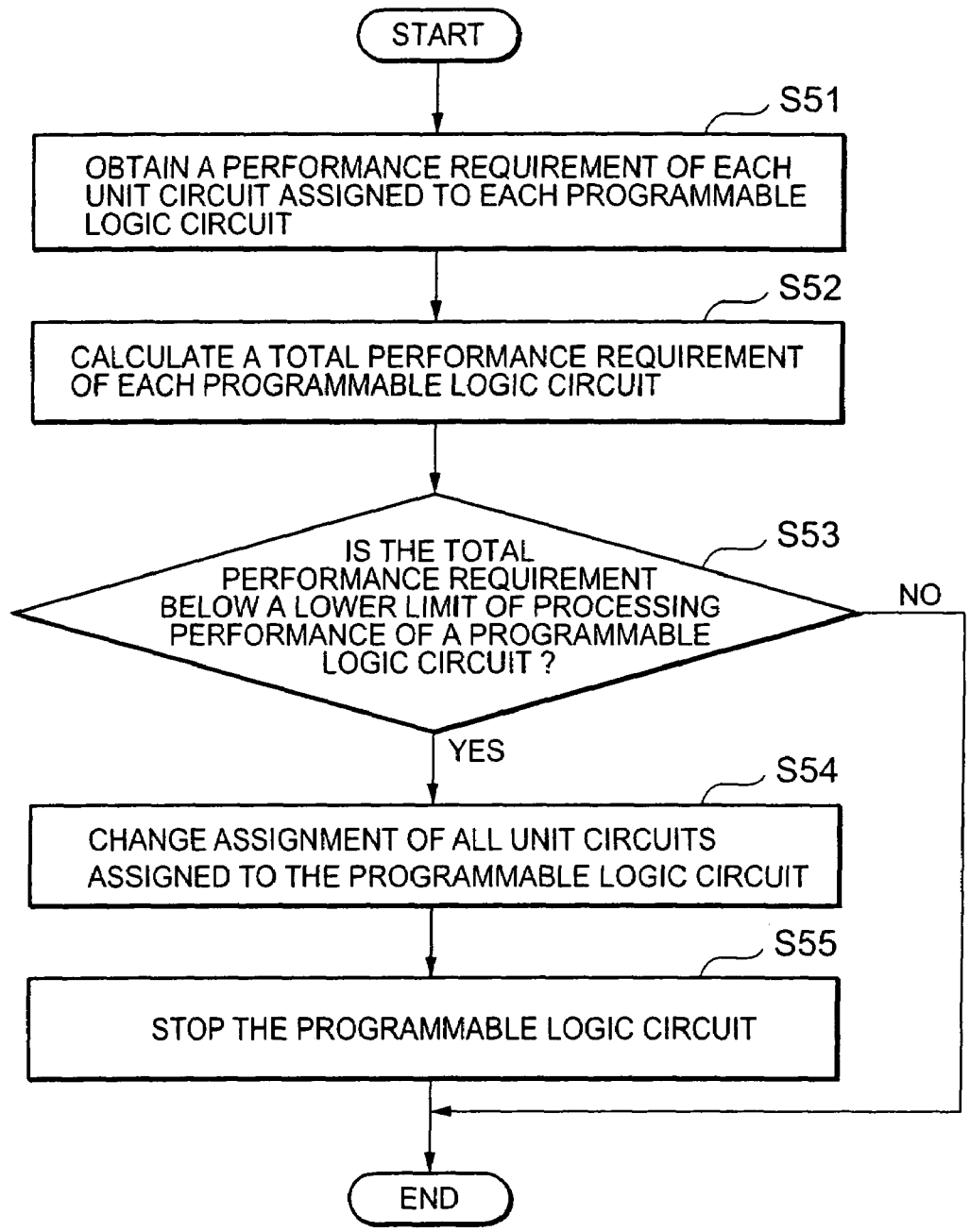
FIG. 16 is a flow chart of another processing of the logic circuit apparatus of FIG. 13.

FIG. 16 is a flow chart of another processing of the logic circuit apparatus according to the second embodiment. First, performance requirements of unit circuits assigned to each programmable logic circuit are obtained (S51). Next, a total performance requirement of each programmable logic circuit is calculated (S52). In case of assignment change of unit circuits, the control unit 15 compares the total performance requirement of each programmable logic circuit with a lower limit of processing performance of each programmable logic circuit (stored in the operation range memory 17) (S53). If the total performance requirement of the programmable logic circuit is below the lower limit, and if the processing performance of another programmable logic circuit is below an upper limit, the control unit 15 changes unit circuits assigned to the programmable logic circuit to another programmable logic circuit (S54), and stops the programmable logic circuit (S55).

Figure 17:
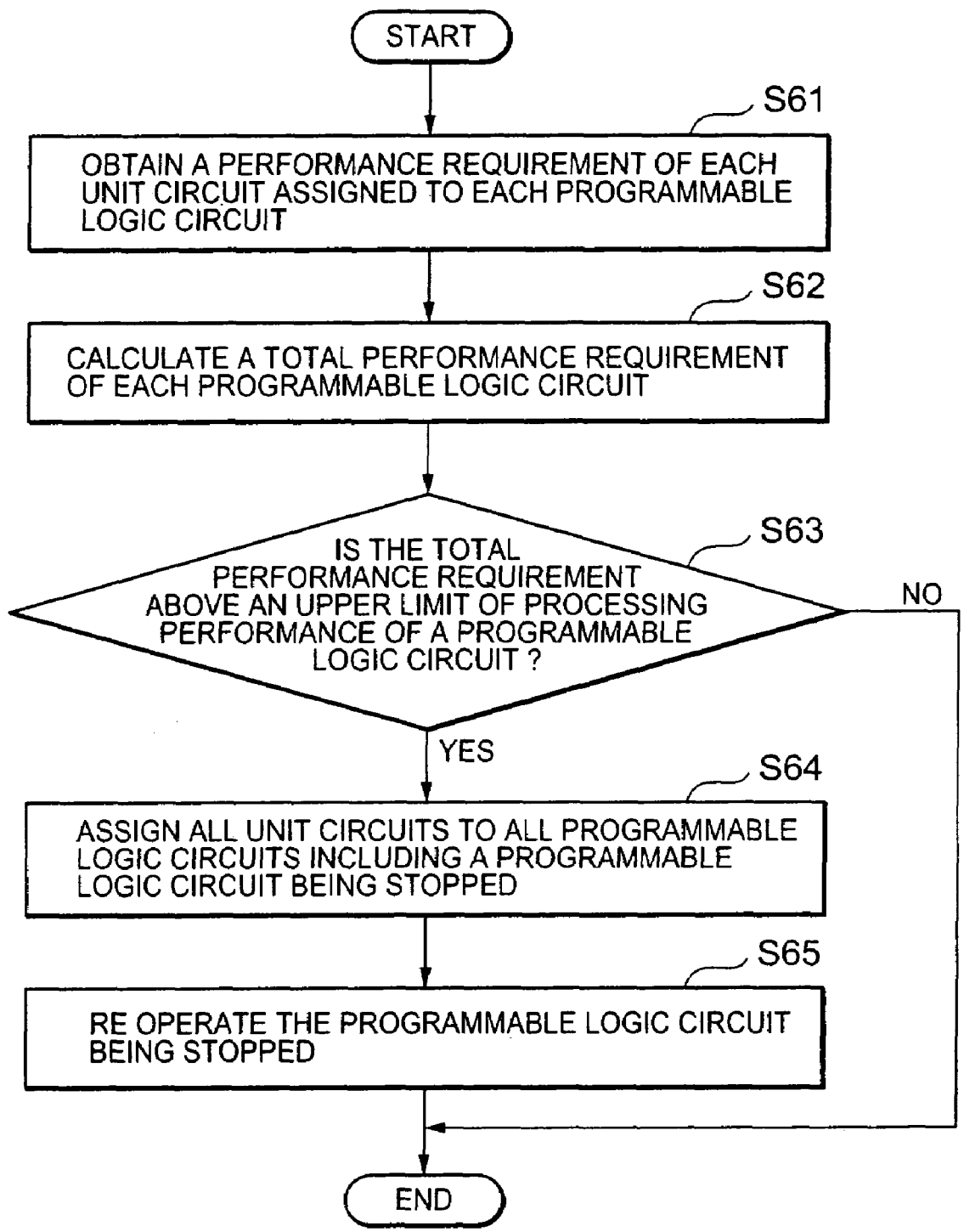
FIG. 17 is a flow chart of the other processing of the logic circuit apparatus of FIG. 13.

In case of assignment change of unit circuits, if a total performance requirement of the programmable logic circuit is above an upper limit of processing performance (stored in the operation range memory 17) and if another programmable logic circuit being stopped exists at this time, assignment change of unit circuits is executed for all programmable logic circuits (including another programmable logic circuit being stopped), and operation of another programmable logic circuit being stopped is started. FIG. 17 is a flow chart of this processing of the logic circuit apparatus according to the second embodiment.

First, performance requirements of unit circuits assigned to each programmable logic circuit are obtained (S61). Next, a total performance requirement of each programmable logic circuit is calculated (S62). Then, it is decided whether the total performance requirement is above an upper limit of processing performance stored in the operation range memory 17 (S63). If the total performance requirement is above the upper limit, all unit circuits are selectively reassigned to programmable logic circuits including a programmable logic circuit being stopped (S64). Hereafter, the programmable logic circuit being stopped starts to operate (S65).

In case of assignment change of unit circuits, if the total performance requirement is not above the upper limit for all programmable logic circuits and if at least one programmable logic circuit being stopped at this time exists, assignment change of unit circuits is executed for all programmable logic circuits excluding the at least one programmable logic circuit.

In case of stopping at least one programmable logic circuit and reassigning unit circuits to other programmable logic circuits (each continuously operating), unit circuits may be assigned the other programmable logic circuits in lower order of power consumption value or in lower order of current performance requirement. Otherwise, unit circuits may be assigned to a predetermined programmable logic circuit or based on another method.

In case of stopping at least one programmable logic circuit and reassigning unit circuits to other programmable logic circuits (each continuously operating), one unit circuit may be repeatedly selected from unit circuits assigned to the programmable logic circuit of the highest power consumption value and assigned to another programmable logic circuit to start operating. At least one unit circuit assigned to the programmable logic circuit of the highest total performance requirement may be reassigned to another programmable circuit to start operating. In case of stating operation of a programmable logic circuit, a unit circuit (originally assigned to the programmable logic circuit) reassigned to another programmable logic circuit may be returned to the programmable logic circuit. A predetermined number of unit circuits may be selected from unit circuits assigned to programmable logic circuits each operating and assigned to another programmable logic circuit to start operating.

In the second embodiment, in case that programmable logic circuits have processing performance to spare, a predetermined programmable logic circuit is stopped and other programmable logic circuits continuously execute processing. As a result, power consumption of the system can be reduced.

Figure 18:
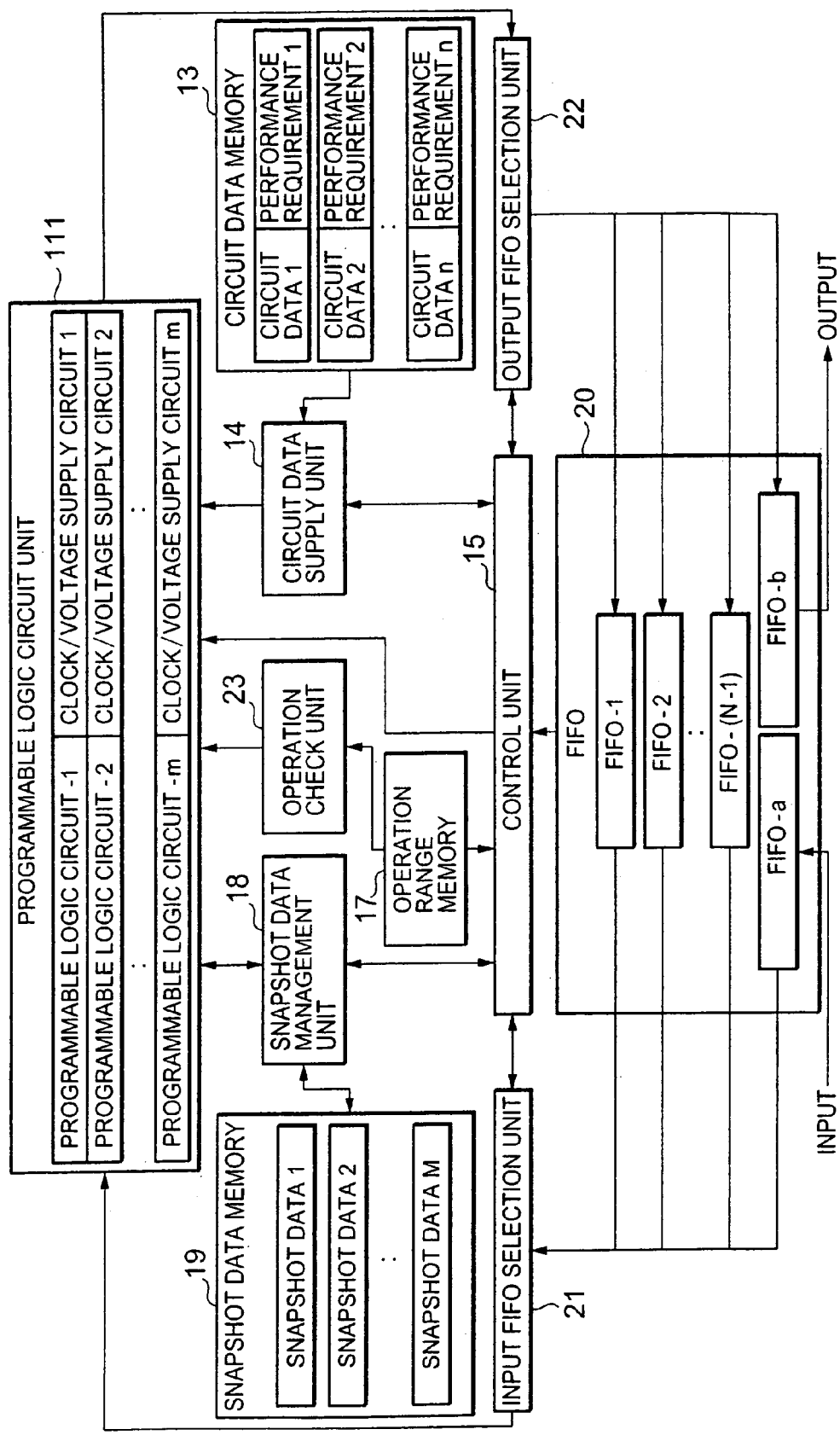
FIG. 18 is a block diagram of the logic circuit apparatus according to a third embodiment.

FIG. 18 is a block diagram of the logic circuit apparatus according to a third embodiment. In the third embodiment, an operation check unit 23 is added to the logic circuit apparatus of FIG. 13. As for an upper limit and a lower limit (of clock frequency and voltage) of each programmable logic circuit (stored in the operation range memory 17), the operation check unit 23 checks whether each programmable logic circuit normally operates within the upper limit and the lower limit by using a unit circuit for check. In case of detecting normal operation, each programmable logic circuit returns to usual processing.

In case of detecting abnormal operation for the upper limit, the operation check unit 23 resets the upper limit lower by a predetermined value or a ratio, and checks again. In case of detecting abnormal operation for the lower limit, the operation check unit 23 resets the lower limit higher a predetermined value or ratio, and checks again. The upper limit and the lower limit are repeatedly reset and checked until the programmable logic circuit normally operates. In case of detecting abnormal operation by check, both frequency and voltage may be changed to check again. Voltage may be changed to check again by fixing frequency, or frequency may be changed to check again by fixing voltage.

The operation check unit 23 may check an arbitrary programmable logic circuit by stopping operation of this programmable logic circuit at a predetermined interval. The operation check unit 23 may check all programmable logic circuits each activating immediately after turning on. Otherwise, both check processing may be executed.

Figure 19:
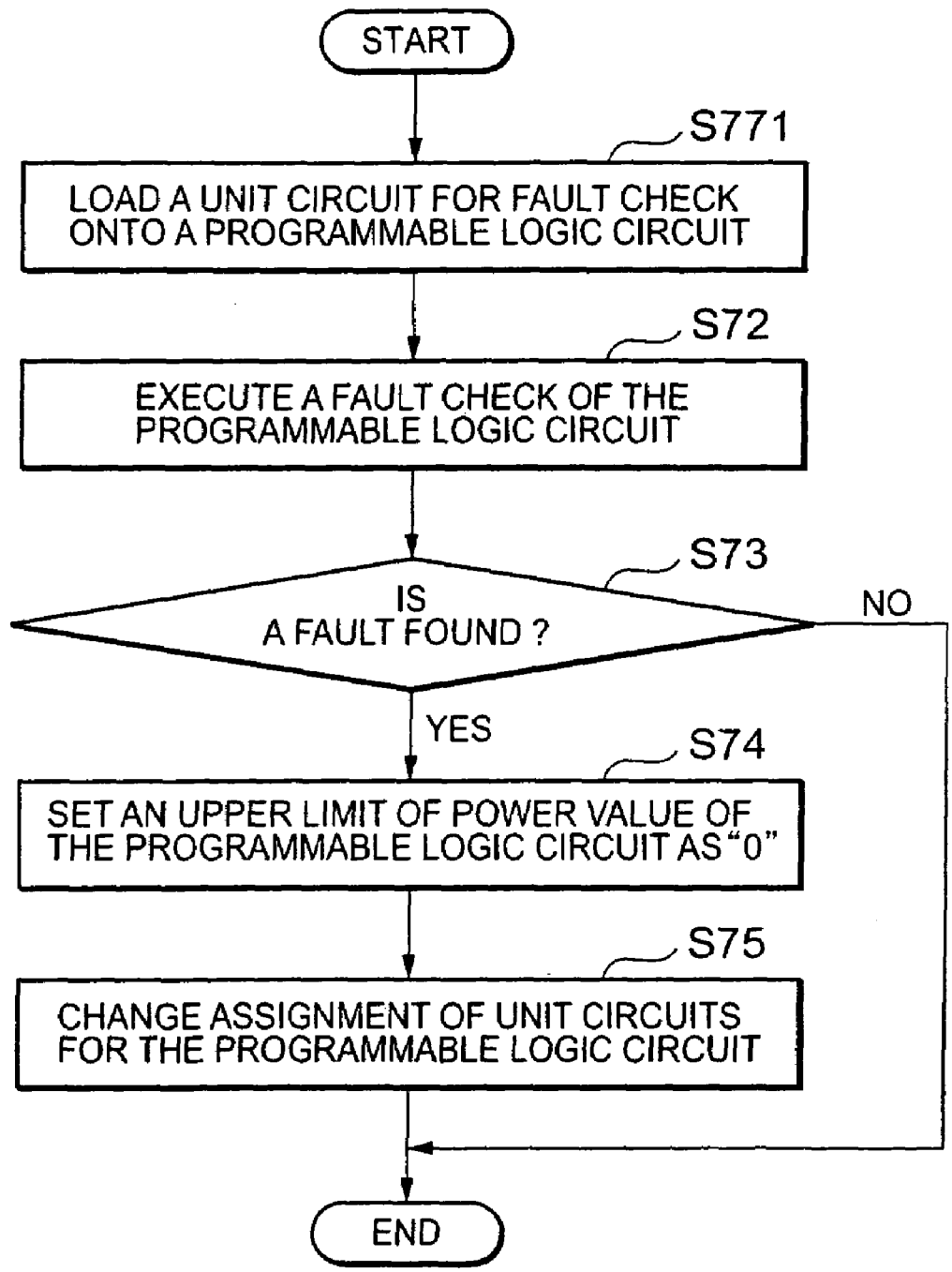
FIG. 19 is a flow chart of processing of the logic circuit apparatus of FIG. 18.

FIG. 19 is a flow chart of processing of the logic circuit apparatus according to the third embodiment. First, a unit circuit for fault check is loaded onto a programmable logic circuit (S71). Next, fault check is executed for the programmable logic circuit (S72) and it is decided whether the programmable logic circuit includes a fault (S73). If a fault is detected, an upper limit of clock frequency of the programmable logic circuit (stored in the operation range memory 17) is set as "0" (S74). In this case, an upper limit of voltage may be set as "0". Then, unit circuits assigned to this programmable logic circuit are changed to other programmable logic circuits (S75).

As mentioned-above, by configuring and operating a check circuit on each programmable logic circuit, the operation check unit 23 detects a programmable logic circuit abnormally operating irrespective of voltage/frequency. In case of detecting a programmable logic circuit abnormally operating, the operation check unit 23 sets the upper limit of processing performance of this programmable logic circuit (stored in the operation range memory) as "0", and reassigns unit circuits assigned to this programmable logic circuit to other programmable logic circuits.

The check circuit may execute the same operation for a plurality of programmable logic circuits and detect a programmable logic circuit of which processing result is uniquely different. Furthermore, a test for the special purpose of programmable logic circuit such as scan test may be executed. The operation check unit 23 may check by stopping operation of at least one programmable logic circuit at a predetermined interval, or may check all programmable logic circuits each activating immediately after turning on.

Figure 20:
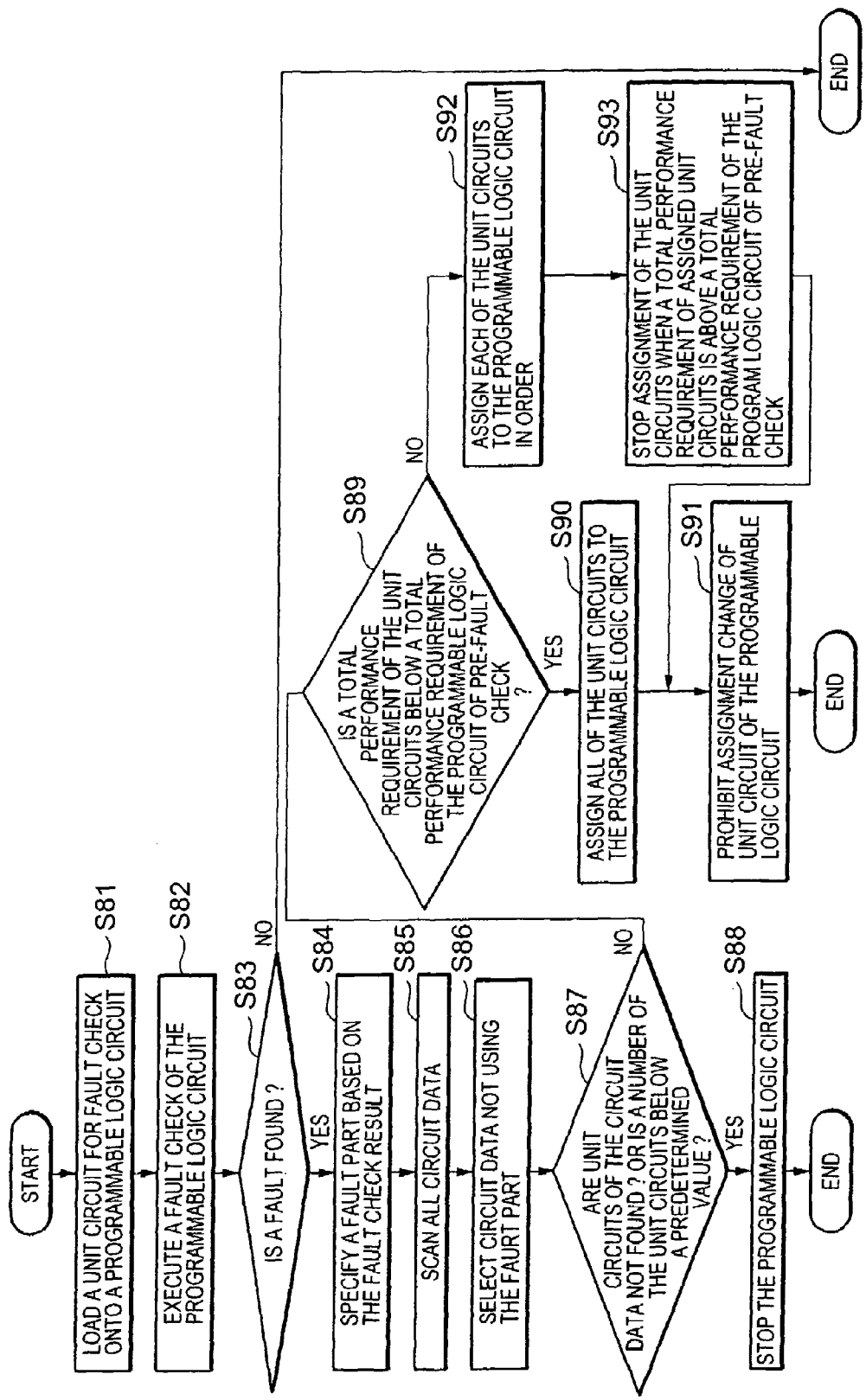
FIG. 20 is a flow chart of another processing of the logic circuit apparatus of FIG. 18.

FIG. 20 is a flow chart of another processing of the logic circuit apparatus according to the third embodiment. First, a unit circuit for fault check is loaded onto a programmable logic circuit (S81). Next, fault check is executed for a programmable logic circuit (S82), and it is decided whether the programmable logic circuit includes a fault (S83). If the programmable logic circuit includes the fault, a fault part in the programmable logic circuit is specified based on the fault check result (S84). Next, all circuit data are scanned (examined) (S85). By the scanning, circuit data (unit circuits) not using the fault part (in the programmable logic circuit) is specified (S86). Then, it is decided whether unit circuits not using the fault part are not specified or whether a number of the unit circuits is below a predetermined value (S87). If the unit circuits are not specified or the number of the unit circuits is below the predetermined number, the programmable logic circuit is stopped (S88) and processing is completed. If the unit circuits are specified and the number of the unit circuits is not below the predetermined number, it is decided whether a total performance requirement of the unit circuits is below a total performance requirement of the programmable logic circuit of pre-fault check (S89). If the total performance requirement of the unit circuits is below the total performance requirement of this programmable logic circuit of pre-fault check, all of the unit circuits are assigned to this programmable logic circuit (S90). Then, assignment change of unit circuit is prohibited for this programmable logic circuit (S91), and processing is completed.

If the total performance requirement of the unit circuits is not below the total performance requirement of the programmable logic circuit of pre-fault check, each of the unit circuits is assigned to this programmable logic circuit in order (S92). When a total performance requirement of assigned unit circuits is above a total performance requirement of this programmable logic circuit of pre-fault check for the first time, assignment of unit circuit is stopped for this programmable logic circuit (S93), and processing is forwarded to S91.

As mentioned-above, in the third embodiment, control to stop assignment change of unit circuits for a specified programmable logic circuit is newly added. Briefly, in case of detecting abnormal operation of the programmable logic operation or in case of checking in detail after detecting abnormal operation, the operation check unit 23 specifies a fault part in the programmable logic circuit. Then, by examining circuit data stored in the circuit data memory 13, the operation check unit 23 retrieves circuit data (unit circuit) not using the fault part. This retrieval is executed by checking information of predetermined position in circuit data.

After examining all circuit data (all unit circuits), a total performance requirement of unit circuits each not using the fault part is calculated. The unit circuits are assigned to this programmable logic circuit so that processing load of assigned unit circuits is equal to processing load of pre-fault check at the maximum.

Furthermore, hereafter, assignment change of unit circuits is not executed for this programmable logic circuit while assignment change of unit circuits is executed for other programmable logic circuits. In case of assigning unit circuits not using the fault part to a programmable logic circuit (including the fault), if performance requirement of unit circuits assigned to the programmable logic circuit is below a lower limit of processing performance of the programmable logic circuit (stored in the operation range memory), this programmable logic circuit is stopped. In this case, all of unit circuits assigned to this programmable logic circuit are reassigned to other programmable logic circuits.

In the third embodiment, in case of occurring a fault in some programmable logic circuit, processing can be continued by evading the fault and by utilizing component element irrelevant to the fault part. Furthermore, the fault can be quickly notified to a user.

Figure 21:
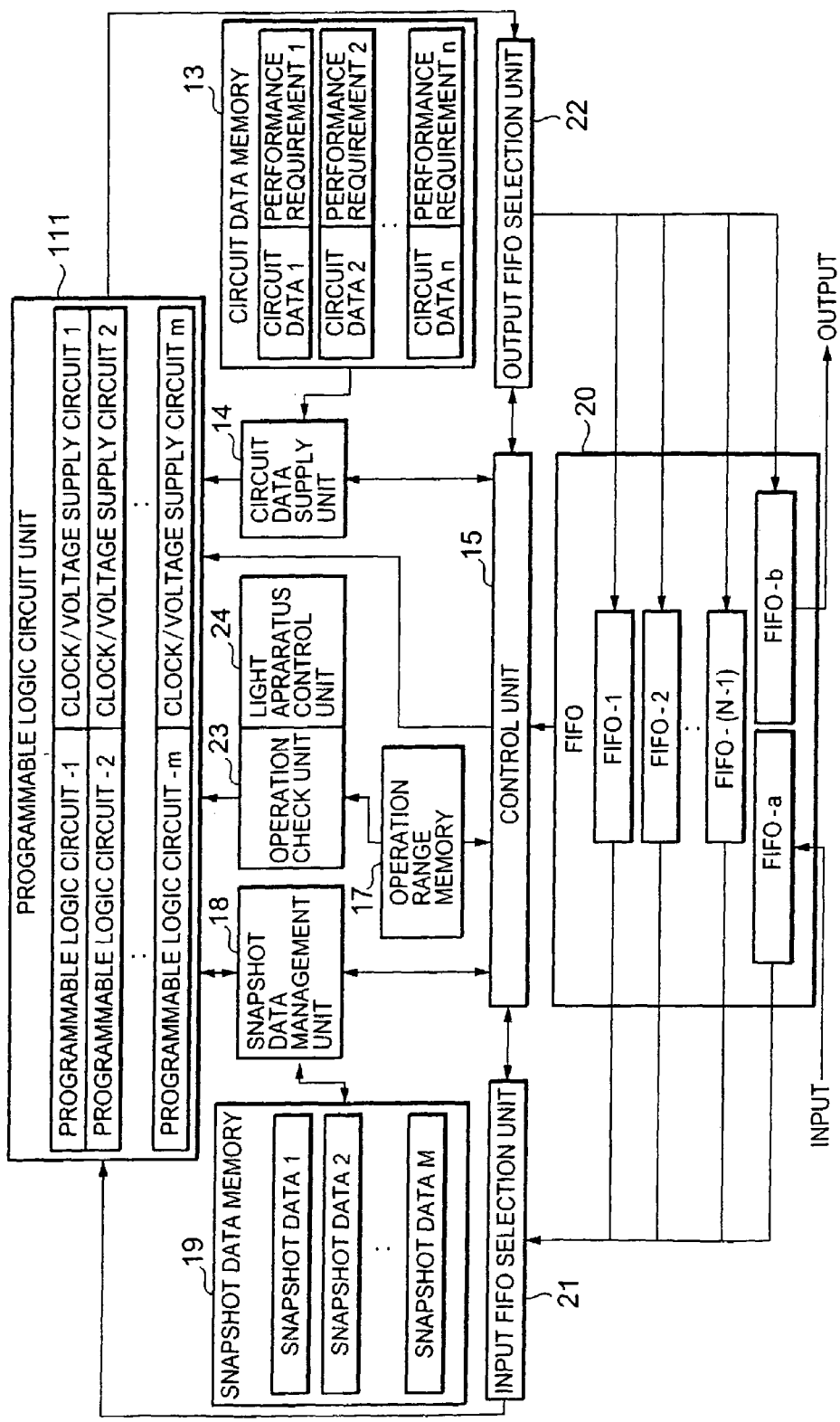
FIG. 21 is a block diagram of the logic circuit apparatus according to a fourth embodiment.

FIG. 21 is a block diagram of the logic circuit apparatus according to a fourth embodiment. In the fourth embodiment, unusual notification unit (light apparatus control unit 24) is newly added as an external apparatus to the third embodiment of FIG. 18. In case of detecting a fault by the operation check unit 23, the light apparatus control unit 24 controls a light apparatus (not shown in FIG. 2) to light. The light apparatus control unit 24 may be commonly set to all programmable logic circuits or differently set for each programmable logic circuit. In case of commonly set, based on a number of programmable logic circuits each including fault, light operation such as color or blink may be varied.

In the above-mentioned logic circuit apparatus, processing contents (unit circuits) to be executed at a predetermined speed (quicker than processing speed of each logical circuit) within a predetermined time are distributed among programmable logic circuits so that a total power consumption of all programmable logic circuits is minimized, and parallely executed. In comparison with distribution method to equalize processing load of each programmable logic circuit, the processing contents can be executed by processing speed of each logical circuit in low power consumption.

An example is explained. Assume that a logic circuit 1 operates at 200 MHz in case of a supply voltage of 1.1V, and a logic circuit 2 operates at 150 MHz in case of a supply voltage of 1.1V. Furthermore, assume that the logic circuit 1 operates at 250 MHz in case of a supply voltage of 1.2V, and the logic circuit 2 operates at 200 MHz in case of a supply voltage of 1.2V. Briefly, operation frequency increases in proportion to increase of voltage.

Under this assumption, a case that processing contents can be executed within predetermined time by processing speed as operation 350 MHZ is considered. If the processing contents are equally assigned to the logic circuits 1 and 2, i.e., if processing contents 175 MHz (a half of 350 MHz) are respectively assigned to the logic circuits 1 and 2, the logic circuit 1 can execute the processing 175 MHz for supply voltage 1.1V because the logic circuit 1 executes processing at 200 MHz in case of supply voltage 1.1V. On the other hand, the logic circuit 2 cannot execute the processing at 175 MHz for supply voltage 1.1V because the logic circuit 2 can execute processing at 150 MHz at the maximum in case of supply voltage 1.1V. Accordingly, supply voltage of the logic circuit 2 must increase.

However, as for supply voltage 1.1V, the logic circuit 1 can execute processing at 200 MHz while the logic circuit 2 can execute processing at 150 MHz. If processing contents 350 MHz are distributed to the logic circuit 1 as 200 MHz and the logic circuit 2 as 150 MHz, processing contents 350 MHz can be executed as a whole. In this case, both the logic circuit 1 and the logic circuit 2 can be parallely operated by voltage 1.1V. Briefly, processing contents to be executed by predetermined speed (quicker than processing speed of each programmable logic circuit) within a predetermined time are distributed to each programmable logic circuit so that a total power consumption of all programmable logic circuits is minimized. In comparison with distribution method to equalize processing load of each programmable logic circuit, the processing contents can be executed by speed of each programmable logic circuit in low power consumption. The power consumption is in proportion to supply voltage. Accordingly, the lower the supply voltage is, the lower the power consumption is.

Furthermore, when the operation check unit detects that any one of programmable logic circuits is broken, this programmable logic circuit is set as non-use, and a supply voltage for other programmable logic circuits is slightly raised. As a result, processing to be executed by the broken programmable logic circuit can be supplemented.

As mentioned-above, in the present invention, if a plurality of programmable logic circuits differently has each operation feature, low power consumption can be realized for each programmable logic circuit, and power efficiency of the system can raise.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A logic circuit apparatus, comprising:
a plurality of programmable logic circuits, each configured to have a changeable circuit component based on circuit data;
a circuit data memory to store a plurality of circuit data and performance requirements, the circuit data representing a unit circuit of processing, the performance requirements representing a processing performance for the unit circuit;
a supply unit configured to supply a voltage to the plurality of programmable logic circuits;
a feature data memory to store feature data of each programmable logic circuit, the feature data representing an operation range of a voltage; and
a control unit configured to calculate a minimum voltage of the plurality of programmable logic circuits to execute the plurality of circuit data based on the performance requirements, to selectively assign the plurality of circuit data to the plurality of programmable logic circuits so that the performance requirement of the circuit data assigned to each programmable logic circuit is within the operation range of the programmable logic circuit at the minimum voltage, and to control said supply unit to supply the minimum voltage to the plurality of programmable logic circuits.

2. The logic circuit apparatus according to claim 1, wherein said supply unit is further configured to supply a clock signal in cooperation with the voltage.

3. The logic circuit apparatus according to claim 2, wherein the feature data includes an upper limit and a lower limit of a clock frequency and the voltage as the operation range of each programmable logic circuit.

4. The logic circuit apparatus according to claim 3, wherein said control unit is further configured to determine a clock frequency related to the minimum voltage based on the feature data, and control said supply unit to supply a clock signal of the clock frequency with the minimum voltage to the plurality of programmable logic circuits.

5. The logic circuit apparatus according to claim 3, wherein said supply unit is further configured to respectively supply the clock signal and the voltage to each programmable logic circuit.

6. The logic circuit apparatus according to claim 5, wherein said control unit is further configured to calculate a performance requirement of each unit circuit assigned to each programmable logic circuit, calculate a time to stop a programmable logic circuit if the performance requirement is below the lower limit of the programmable logic circuit, and stop the programmable logic circuit for the time.

7. The logic circuit apparatus according to claim 5, wherein said control unit is further configured to calculate a performance requirement of each unit circuit assigned to each programmable logic circuit, stop a programmable logic circuit if the performance requirement is below the lower limit of the programmable logic circuit, and reassign the assigned unit circuits of the programmable logic circuit to other programmable logic circuits.

8. The logic circuit apparatus according to claim 5, wherein said control unit is further configured to calculate a performance requirement of each unit circuit assigned to each programmable logic circuit, selectively reassign all unit circuits to all programmable logic circuits including a programmable logic circuit being stopped if the performance requirement of at least one programmable logic circuit is above the upper limit of the one programmable logic circuit, and start operation of the programmable logic circuit being stopped.

9. The logic circuit apparatus according to claim 3, further comprising:
an operation check unit configured to load a unit circuit for a fault check onto each programmable logic circuit, and to operate the unit circuit for the fault check in each programmable logic circuit.

10. The logic circuit apparatus according to claim 9, wherein said operation check unit is further configured to set the upper limit of a programmable logic circuit as zero in said feature data memory if a fault is detected in the programmable logic circuit; and
wherein said control unit is further configured to reassign the assigned unit circuits of the programmable logic circuit to other programmable logic circuits.

11. The logic circuit apparatus according to claim 10, wherein said operation check unit is further configured to specify a fault part in the programmable logic circuit based on a fault check result; and
wherein said control unit is further configured to select unit circuits not using the fault part from said circuit data memory, and stop the programmable logic circuit if the unit circuits do not exist or a number of the unit circuits is below a predetermined number.

12. The logic circuit apparatus according to claim 11, wherein, if the number of the unit circuits is not below the predetermined number and if a performance requirement of the unit circuits is below a performance requirement of the programmable logic circuit of a pre-fault check, said control unit is further configured to assign the unit circuits to the programmable logic circuits, and prohibit an assignment change of the unit circuit for the programmable logic circuit.

13. The logic circuit apparatus according to claim 12, wherein, if a performance requirement of the unit circuits is not below a performance requirement of the programmable logic circuit of the pre-fault check, said control unit is further configured to assign each of the unit circuits to the programmable logic circuit in order, and stops assignment of each unit circuit to the programmable logic circuit when a performance requirement of assigned unit circuits is above a performance requirement of the programmable logic circuit of the pre-fault check for the first time.

14. The logic circuit apparatus according to claim 9, further comprising:
a light control unit configured to light through an external light apparatus when said fault check unit detects a fault in the programmable logic circuit.

15. The logic circuit apparatus according to claim 1, wherein said control unit is further configured to calculate a power consumption value of each programmable logic circuit based on the performance requirement of each unit circuit assigned to each programmable logic circuit and the voltage of each programmable logic circuit, and reassign one of the assigned unit circuits of a programmable logic circuit of the largest power consumption value to another programmable logic circuit of the smallest power consumption value.

16. The logic circuit apparatus according to claim 1, wherein said control unit is further configured to calculate a power efficiency per one cycle of each programmable logic circuit based on the performance requirement of each unit circuit assigned to each programmable logic circuit and the voltage of each programmable logic circuit, and reassign one of the assigned unit circuits of a programmable logic circuit having the lowest power efficiency to another programmable logic circuit having the highest power efficiency.

17. The logic circuit apparatus according to claim 1, wherein said control unit is further configured to calculate a total power consumption value of all programmable logic circuits based on the performance requirement of each unit circuit assigned to each programmable logic circuit and the voltage of each programmable logic circuit, calculate a threshold processing performance of each programmable logic circuit based on the total power consumption value, and decide whether a difference between the threshold and the performance requirement of each programmable logic circuit is above a predetermined value.

18. The logic circuit apparatus according to claim 17, wherein, if the difference is above the predetermined value, said control unit is further configured to select one of the assigned unit circuits of a programmable logic circuit having the performance requirement above the threshold, and reassign the one unit circuit to another programmable logic circuit having a performance requirement not above the threshold.

19. A computer program product comprising computer readable program code embodied in said product, said program code to be executed by a computer for causing the computer to perform a method comprising:
   causing the computer to use a plurality of programmable logic circuits each having a changeable circuit component based on circuit data;
   storing a plurality of circuit data and performance requirements, the circuit data representing a unit circuit of processing, the performance requirements representing a processing performance for the unit circuit;
   storing feature data of each programmable logic circuit, the feature data representing an operation range of a voltage;
   calculating a minimum voltage of the plurality of programmable logic circuits to execute the plurality of circuit data based on the performance requirements;
   selectively assigning the plurality of circuit data to the plurality of programmable logic circuits so that the performance requirement of circuit data assigned to each programmable logic circuit is within the operation range of the programmable logic circuit at the minimum voltage; and
   supplying the minimum voltage to the plurality of programmable logic circuits.

* * * * *